United States Patent
Ghiron et al.

(10) Patent No.: US 6,934,444 B2
(45) Date of Patent: Aug. 23, 2005

(54) BEAM SHAPING AND PRACTICAL METHODS OF REDUCING LOSS ASSOCIATED WITH MATING EXTERNAL SOURCES AND OPTICS TO THIN SILICON WAVEGUIDES

(75) Inventors: Margaret Ghiron, Allentown, PA (US); Prakash Gothoskar, Allentown, PA (US); Robert Keith Montgomery, Easton, PA (US); Vipulkumar Patel, Monmouth Junction, PA (US); Soham Pathak, Allentown, PA (US); Kalpendu Shastri, Orefield, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 10/720,372

(22) Filed: Nov. 24, 2003

(65) Prior Publication Data

US 2004/0202418 A1 Oct. 14, 2004

Related U.S. Application Data

(60) Provisional application No. 60/461,697, filed on Apr. 10, 2003.

(51) Int. Cl.[7] ................................................. G02B 6/34
(52) U.S. Cl. ......................................... 385/36; 385/51
(58) Field of Search .................................... 385/36, 51

(56) References Cited

U.S. PATENT DOCUMENTS 3,586,872 A * 6/1971 Tien ........................... 359/332
4,152,045 A * 5/1979 Hammer ....................... 385/36
4,832,428 A * 5/1989 Miyawaki et al. ............. 385/33
6,219,475 B1 * 4/2001 Lee .............................. 385/31
6,526,187 B1 * 2/2003 Deliwala ...................... 385/11
6,654,511 B2   11/2003 Deliwala

OTHER PUBLICATIONS

L.A. Coldren (PI), Y.A. Akulova, E.M. Strzelecka, B.J. Thigeault, J.C. Ko and D.A. Louderback, "VCSEL Array Packaging for Free Space Interconnects", University of CA, Santa Barbara, CA; Report 1996–97 for Micro Project 96–050.

P.K. Tien, R. Ulrich; "Theory of Prism–Film Coupler and Thin–Film Light Guides", Journal of the Optical Society of America, vol. 60, No. 10, Oct. 1970.

R. Ulrich; "Theory of the Prism–Film Coupler by Plane–Wave Analysis"; Journal of the Optical Society of America, vol. 60, No. 10, Oct. 1970.

Hiroshi Nishihara; Masa Mitsu Haruna, Toshiaki Suhara, "Optical Integrated Circuits", 1985; Ohmsha, Ltd.

* cited by examiner

Primary Examiner—Akm Enayet Ullah
Assistant Examiner—Jerry T Rahll

(57) ABSTRACT

A practical realization for achieving and maintaining high-efficiency transfer of light from input and output free-space optics to a high-index waveguide of sub-micron thickness is described. The required optical elements and methods of fabricating, aligning, and assembling these elements are discussed. Maintaining high coupling efficiency reliably over realistic ranges of device operating parameters is discussed in the context of the preferred embodiments.

46 Claims, 17 Drawing Sheets

(a)

(b)

(c)

(d)

BEAM SHAPING AND PRACTICAL METHODS OF REDUCING LOSS ASSOCIATED WITH MATING EXTERNAL SOURCES AND OPTICS TO THIN SILICON WAVEGUIDES

CROSS-REFERENCE TO RELATED APPLICATION

This application claims the benefit of Provisional Application No. 60/461,697, filed Apr. 10, 2003.

TECHNICAL FIELD

The present invention relates to coupling arrangements associated with thin silicon optical waveguides and, more particularly, to beam shaping and methods of reducing loss associated with mating external sources and optics to such thin waveguides.

BACKGROUND OF THE INVENTION

For many device applications, an input signal must be pre-processed within the device so that it is optimized for device-specific technology that performs the primary functions; similarly, prior to transmission to the outside world, the signal emerging from the device core must be post-processed to produce a signal that is compatible with typical user requirements. For optoelectronic modules, the required optical signal processing includes functions such as light generation, wavelength control, polarization control, phase control, beam steering, beam shaping, beam splitting or recombination, modulation, and detection. For ease of use, or for control of parameters that are critical to device performance, it is often desirable to integrate many pre- and post-processing functions inside the module itself. For example, a significant benefit is that optical insertion loss of the device can often be reduced by integrating more optical functions into the module. This occurs because component selection can be more easily optimized for the device-specific technology, and also because the number of physical connections between different devices or modules has been reduced. A low-loss optoelectronic module is enabling for system applications, as it can be more easily deployed at different points in a system and lengthens the span associated with the system. In addition, the physical dimensions or "footprint" of the device can be shrunk by component integration.

Integration of the pre-processing and post-processing optical functions is especially critical for silicon-based optoelectronic circuits operating at infrared wavelengths. Since silicon-based lasers are not yet widely available for commercial applications, it is not currently possible to incorporate the light source in the same silicon wafer as the signal processing and receiver elements. Thus, the light signal must be introduced to the silicon waveguide from an external source. This requires intervening optical elements (between the source and the waveguide) to pre-process the signal so that a substantial fraction of the light intensity can be transferred to the waveguide. In addition, because silicon-based detectors appropriate for infrared wavelengths are just beginning to be developed, the light signal must be transferred from the silicon waveguide to an external detector or receiver element. Thus, optical elements are also required on the output side of the device for post-processing of the optical signal.

Exemplary methods of coupling light into high-index contrast waveguides known from prior art include prism couplers, grating couplers, tapered mode converters, and specially shaped fiber terminations or lensed fibers. While all these optical elements have been used in laboratory environments to transfer a fraction of the light available from an external source into a high-index contrast waveguide, significant limitations arise when these components are incorporated into low-loss device prototypes or finished product.

For example, the smallest spot size that can be produced by specially shaped fiber terminations, lensed fibers, or tapered mode converters is on the order of 1.5 $\mu$m, which is incompatible with the sub-micron dimensions of some silicon waveguides. In particular, a number of applications require single-mode silicon waveguides that have dimensions on the order of 0.35 $\mu$m or less. The mismatch in the mode-field diameters of the output beam of the specially prepared fiber or tapered mode converter and that of the waveguide mode results in very high insertion loss. Even if the waveguide thickness is on the order of a few microns, the requirement that input and output ports for devices must be located at edge facets of the wafer die containing the waveguide imposes significant restrictions on device geometry (for example, device topology and size) when coupling to specially prepared fibers or tapered mode converters.

The restrictions discussed above can be relaxed by employing either grating couplers or prism couplers to couple light from an external source into and out of high-index contrast waveguides. With appropriate designs, it is possible to successfully couple light into waveguides with thicknesses ranging from tens of nanometers to tens of microns. Moreover, the grating or prism element can be placed at any desired location on the die or wafer surface, facilitating optical access to a considerable fraction of the die or wafer.

Despite these considerable advantages, fabrication difficulties associated with both grating and prism couplers have limited their use to a few specialized applications. The coupling efficiency of grating couplers is relatively sensitive to the grating period, depth, and slant or tilt angles. Theoretically, coupling efficiencies on the order of 70–80% can be achieved if the design targets for the grating parameters are met; in practice, coupling efficiencies on the order of 40% are more commonly observed due to sensitivity to fabrication tolerances.

In the prior art, prism couplers have required that a large bulk-optic element (several mm in dimension) be placed in very close proximity to a waveguide and oriented very precisely with respect to the waveguide. In this context, "very close proximity" is intended to mean that the separation distance between the optical element and the waveguide permits evanescent coupling of light from the optical element to the waveguide. For infrared wavelengths used in telecommunications applications, a typical value of the separation distance falls in the range of 200–550 nm. The required motion control to manipulate the prism relative to the waveguide (for example, using piezoelectric mounts) can be accomplished in a laboratory optical bench or test set-up, but such methods cannot be implemented in a compact optoelectronic package. For this reason, prism coupling applications have been primarily limited to waveguide test and characterization.

Since prism couplers have not been utilized in compact optoelectronic packages in the prior art, optical and mechanical assemblies that are appropriate for use with prism couplers housed in small device structures have not been developed. For example, specific embodiments of exemplary optical elements that deliver light to and receive light from a prism coupler device in a compact optoelectronic package have not been disclosed in the prior art. In a laboratory setting, the optical elements can generally be manipulated or "tuned" in a number of ways to optimize signal transmission when the signal that is introduced to the prism coupler is changed in some way (such as in wavelength, polarization state, beam position, angle of incidence, etc.). For a packaged device, it is preferable to design a device that is transparent to a variety of inputs; that is, limited tuning (or perhaps no tuning) of a small subset of parameters, is required in order for the device to function properly when the input state of the signal is varied. Thus, the choice of optical parameters associated with the input and output beams, the input and output optical elements, and the prism coupler directly impacts the versatility and manufacturability of the device. However, because prism couplers have not been packaged in compact optoelectronic devices in the prior art, specific designs that produce versatile and manufacturable devices have not yet been developed.

Thus, a need remains in the art for designs and implementations of optical systems that can be interfaced to prism couplers in compact, low-loss, and robust optoelectronic packages.

SUMMARY OF THE INVENTION

The need remaining in the prior art is addressed by the present invention, which relates to the design of optical systems that can be utilized to process infrared light signals entering and exiting from compact prism-coupled optoelectronic devices.

In particular, the present invention details several embodiments of optical elements that provide necessary interfaces for permanently coupled, compact prism and waveguide assemblies. These interfaces include, but are not limited to, free-space optical elements that launch light from an external source into high-index prism structures, optical elements or structures formed in the same silicon wafer or die as the etched facets that serve as the prism input and output surfaces, the evanescent coupling layer that forms the direct physical interface between the high-index prism and waveguide, and free-space optical elements that receive the output beam exiting from the output prism surface.

The various embodiments discussed are particularly appropriate for use with thin silicon waveguides in the wavelength bands of interest for telecommunications applications. However the various interface arrangements of the present invention are also useful for other arrangements, perhaps utilizing larger dimensioned waveguides and/or other wavelength ranges. Specific embodiments of launch optics and conditions that provide new and compact packaging solutions for prism-coupled devices are described. Designs that minimize the end-to-end insertion loss of compact optoelectronic devices utilizing prism coupling are disclosed, and theoretical coupling efficiencies are calculated for particular embodiments. Advantageously, specific and manufacturable embodiments of the evanescent coupling layer that lead to desirable output beam profiles and reduced insertion loss are detailed.

The advantages of reducing the required free-space beam size with respect to manufacturing requirements will become clear during the course of the following discussion and by reference to the accompanying drawings.

BRIEF DESCRIPTION OF THE DRAWINGS

Referring now to the drawings.

DETAILED DESCRIPTION

Figure 1:
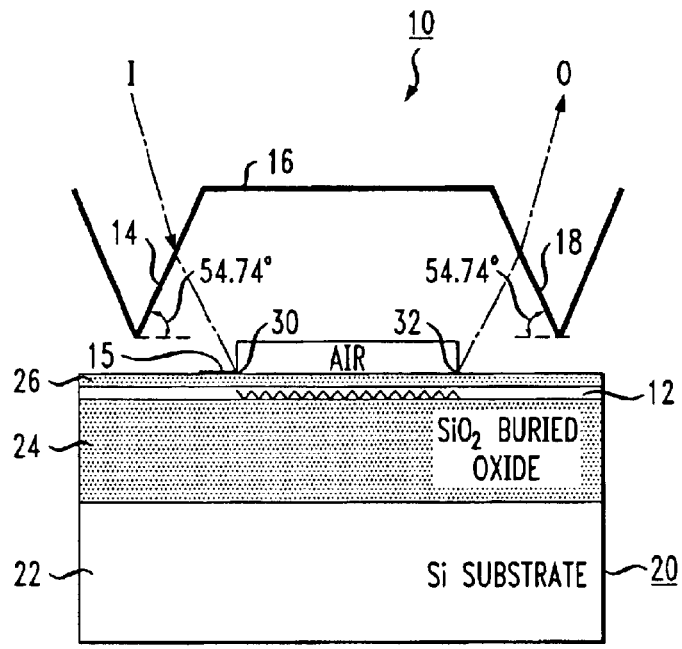
FIG. 1 illustrates an embodiment of a silicon-based prism coupler permanently attached to a silicon-on-insulator wafer containing a silicon waveguide layer.
Figure 2:
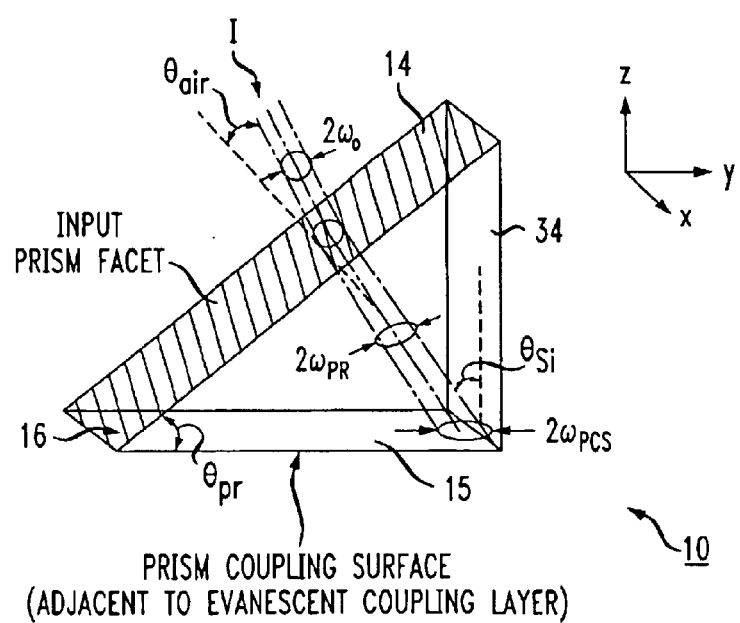
FIG. 2 illustrates the geometry of a beam propagating through a prism structure, including the launch angles exterior and interior to the prism ($\theta_{air}$ and $\theta_{Si}$ respectively), as well as the physical size of the optical coupling region at the prism surface that mates directly to the evanescent coupling layer.

In order to better understand the subject matter of the present invention, it is important to understand the requirements concerning the input beam that is first delivered to the input surface of an exemplary prism structure 10 as shown in FIG. 1, and then coupled to a thin silicon waveguide 12 through the prism structure. A detailed schematic of how the input beam propagates through the prism structure is provided by FIG. 2. The beam enters prism structure 10 through the hypotenuse (input facet) surface 14, which is anti-reflection coated with a layer (or layers) 16 to reduce the substantial Fresnel loss associated with the transit from a low-index medium (air) to the high-index medium (silicon in the embodiment of FIG. 1). Referring to FIG. 2, the input beam makes an angle of incidence $\theta_{air}$ with the normal input facet surface 14, and is then refracted by the prism. To be consistent with known optics, it is most convenient to denote the angle within the prism ($\theta_{Si}$) by the angle that the beam makes with respect to an axis normal to the waveguide. According to the geometry of FIG. 2, $\theta_{Si}$ and $\theta_{air}$ are related by:

$$\theta_{Si} = \theta_{pr} - \sin^{-1}\{\sin\theta_{air}/n_{Si}\},$$

in which $n_{Si}$=refractive index of silicon ≈3.5 for wavelengths in the 1.3–1.6 µm band.

The refraction also enlarges the beam dimension inside the prism, along the axis shown in FIG. 2, by the factor: $2\omega_{PR}/2\omega_o = \{1-(\sin\theta_{air}/n_{Si})^2\}^{1/2}/\cos\theta_{air}$. For coupling efficiency, the projection of this beam upon the prism and evanescent coupling layer interface is a crucial parameter. From the geometry associated with FIG. 2, it can be seen that the relation between the input free-space beam and the projection of the free-space input beam with diameter $2\omega_o$) upon prism coupling surface 15 is given by:

$$(2\omega)_{PCS} = (2\omega_o)\{1-(\sin\theta_{air}/n_{Si})^2\}^{1/2}/(\cos\theta_{air}*\cos\theta_{Si})$$

While FIG. 2 depicts the geometrical constraints governing the propagation of a light beam external and internal to a prism 10, FIG. 1 shows a preferred arrangement in which the prism coupler is formed from a silicon wafer and permanently attached to a mating silicon-on-insulator (SOI) wafer 20 containing waveguide 12. As shown in FIG. 1, waveguide layer 12 is separated from a silicon substrate 22 by a barrier oxide layer 24. Rather than using a discrete precision prism optical element, the required prism surfaces are produced in a silicon wafer through a combination of patterning and etching processes. The required portions of vertical sidewalls 30, 32 can be produced by a variety of etching processes, and prism hypotenuse/facet surfaces 14, 18 are most easily fabricated using an anisotropic wet etch process. Because anisotropic processes etch different crystal planes at different rates, prism hypotenuse surfaces 14, 18 are formed at a specific angle with respect to the plane of the wafer. For the configuration of FIG. 1, the silicon prism wafer has a <100> crystal orientation, so that an anisotropic KOH etch produces prism facets at an angle of 54.74° with respect to the plane of the wafer. By growing or depositing a layer of a material with a refractive index less than that of silicon (n≈3.5) on the base of the silicon prism wafer or the upper waveguide surface of the mating SOI wafer, an evanescent coupling layer 26 is formed. The prism coupler and the SOI wafer containing the waveguide are then permanently attached, preferably using semiconductor bonding processes, although adhesive and solder joining methods could also be employed. In the resultant prism coupler/SOI wafer assembly, the base of prism coupler 10 (prism coupling surface 15) is placed in direct contact with waveguide surface 12 of SOI wafer 20, so that a prism/evanescent coupling layer/waveguide "sandwich" is formed. To reduce Fresnel losses at the input and output prism hypotenuse surfaces, hereinafter referred to as "prism facets", an additional layer (or layers) of material is grown or deposited on the surface of the silicon prism coupler incorporating the prism facets. This layer or multi-layer structure serves as an anti-reflective (AR) coating 16 that significantly improves transmission as light traverses the prism facets.

Figure 3:
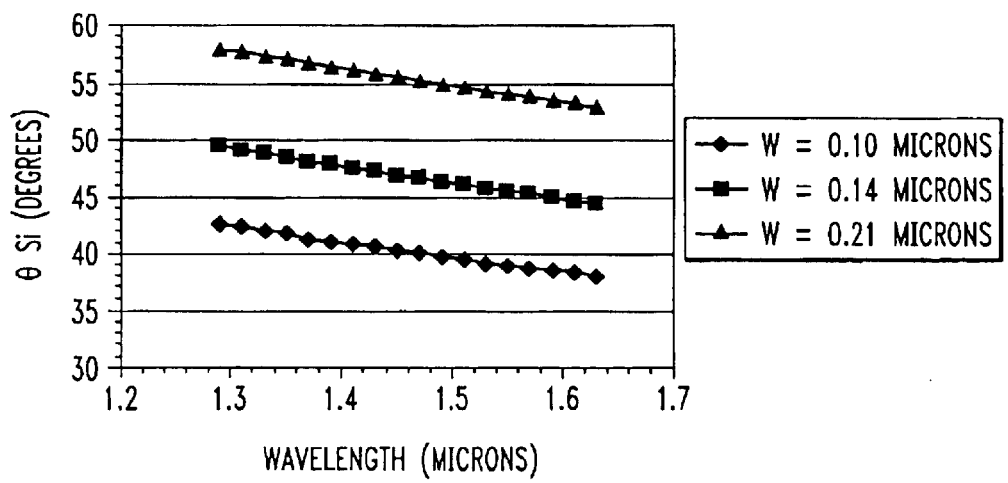
FIG. 3 illustrates the range of beam launch angles $\theta_{Si}$ interior to the prism for the embodiment depicted in FIG. 1, over a range of telecommunication wavelengths, and at three different silicon waveguide thicknesses.
Figure 4:
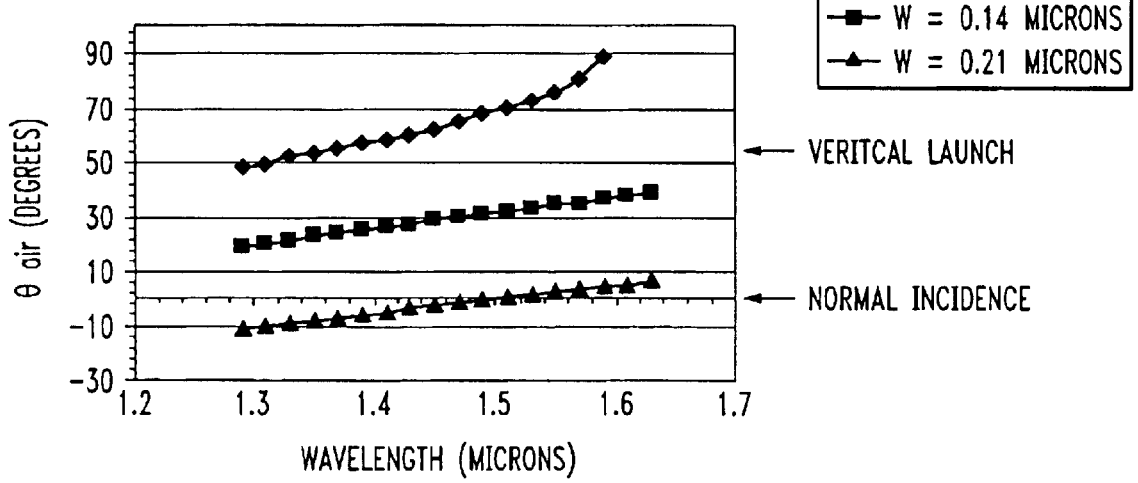
FIG. 4 illustrates the range of beam launch angles in air $\theta_{air}$ (exterior to the prism) for the embodiment depicted in FIG. 1, over a range of telecommunication wavelengths, and at three different silicon waveguide thicknesses.

By using the well-known theory of the prior art, the angle of the beam within the silicon prism structure, $\theta_{Si}$, can be calculated over a range of waveguide thicknesses compatible with single-mode propagation and the wavelength bands of interest for telecommunications applications. The results of the calculation of $\theta_{Si}$ from 1290–1630 nm for waveguide thicknesses of 0.10 µm, 0.14 µm, and 0.21 µm are displayed in FIG. 3. These exemplary waveguide thicknesses are selected because both optical and high-speed electronic functions can be incorporated in these relatively thin waveguides. It can be seen that the beam angle $\theta_{Si}$ (defined in FIG. 2) ranges from about 38° to 58° over the wavelengths and waveguide thicknesses of interest. To determine the appropriate launch angle $\theta_{air}$ external to the prism, the previous result relating $\theta_{air}$ and $\theta_{Si}$ can be used. As discussed previously, for the embodiment shown in FIG. 1, the anisotropic etch process used to produce the input and output angled facets results in a value $\theta_{pr}$=54.74° for the <100> silicon wafer orientation. However, the use of the embodiment of FIG. 1 is not restricted to this particular value of $\theta_{pr}$; any other $\theta_{pr}$ value that may be readily produced from other etch processes or different methods can be used. FIG. 4 shows the results of the calculation of $\theta_{air}$ from 1290–1630 nm for waveguide thicknesses of 0.10 μm, 0.14 μm, and 0.21 μm. The range of angles of incidence in air is considerably larger, varying from −15° to 90°; this is due to the large difference in refractive index between air (n≈1.0) and silicon (n≈3.5).

Figure 5:
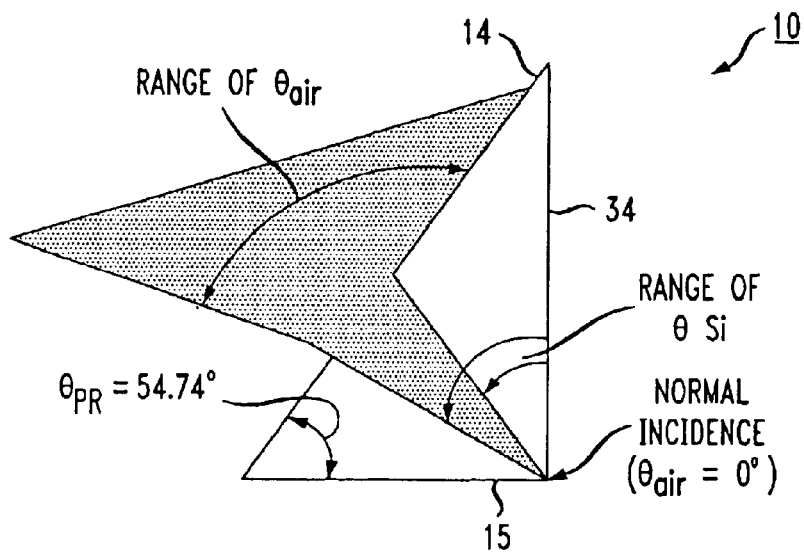
FIG. 5 shows the full range of launch angles interior to the prism structure ($\theta_{Si}$) and exterior to the prism facet ($\theta_{air}$) for the embodiment depicted in FIG. 1, covering a range of device silicon layer thicknesses from 0.1 to 0.21 µm, and a wavelength range from 1290 to 1590 nm.

FIG. 5 provides a pictorial representation of the range of angles within the prism ($\theta_{Si}$) and exterior to the prism ($\theta_{air}$) that must be accessed to use the device across the full range of wavelengths and waveguide thicknesses for a prism with $\theta_{pr}$=54.74°. With the exception of wavelengths longer than 1590 nm for the waveguide thickness of 0.10 μm, the air launch condition can be physically realized over a broad range of wavelengths and waveguide thicknesses. Thus, significant advantages of the embodiment depicted in FIG. 1 include (1) leveraging commonly used semiconductor patterning, etching, and bonding processes to produce a manufacturable prism coupler and waveguide arrangement and (2) comprising a generically useful structure for applications that cover a broad range of infrared wavelengths and waveguide thicknesses.

The utility of the arrangement depicted in FIG. 1 can be further enhanced by selecting optical and spatial characteristics of the input and output beams that simplify the interface of the light signal to the arrangement of FIG. 1. While the wavelength range and power of the input signal is often determined by the application, the polarization, beam shape, beam (or wavefront) quality, and direction of propagation can be modified within the module itself. For prism coupling applications, accurate control of these parameters is required in accordance with the present invention to achieve the desired high coupling efficiency of light from the prism coupler into the waveguide. Specifically, the following conditions must be met:

1) The input beam must be launched at an angle of incidence that is determined by the polarization state and wavelength of the input beam, the refractive indexes and thicknesses of silicon device waveguide layer 12 (hereafter denoted by W) and evanescent coupling layer 26, and the refractive indexes of prism 10 and the surrounding medium. If the input beam is launched at the appropriate angle of incidence, the propagation constants of the fields within prism 10 and waveguide 12 will be matched, allowing for high coupling efficiency.

2) The beam must be highly collimated at prism coupling surface 15, so that the waist of the input Gaussian beam is placed in the vicinity of the prism coupling surface. It is known that if the phase of the wavefront varies significantly over the beam projection on prism coupling surface 15, the coupling efficiency will be reduced.

3) The input beam must intercept prism coupling surface 15 at a specific location, depending on the form of the evanescent coupling layer and the beam profile of the input light signal. For a Gaussian input beam and an evanescent coupling layer 26 of constant thickness, it can be shown that the center of the beam projection on the prism coupling surface should be located at a distance of $0.735\omega_{PCS}$ from vertical sidewall 34 of the prism shown in FIG. 2. to maximize coupling efficiency. The small portion of the beam that is truncated by vertical sidewall 34 is totally internally reflected, first by vertical sidewall 34, and then by prism coupling surface 15, before finally exiting through the output facet 18. It should be noted that small deviations from this position, of $\pm 0.2\omega_{PCS}$, result in a slight reduction (about 10%) in coupling efficiency Truncating the projection of the input beam on prism coupling surface 15 in this specific manner prevents the light transferred to waveguide 12 from the prism structure from coupling back to the prism structure.

4) To maximize coupling efficiency, the thickness of evanescent layer 26 must be appropriate for the dimensions of the projection of the input beam upon prism coupling surface 15, $(2\omega)_{PCS}$. As known form the prior art, coupling efficiency can be maximized by achieving a specific relation between the projection of the input beam (on the order of $(2\omega)_{PCS}$) and a coupling strength parameter (hereinafter referred to as "α") that is determined primarily by the evanescent layer thickness. This occurs because α and $(2\omega)_{PCS}$ are critical parameters in the overlap integral that determines coupling efficiency.

To satisfy these conditions in a compact optoelectronic package, appropriate miniature elements for collimating, shaping, and re-directing the beam, as well as additional optics for polarization and phase control, are key to coupling efficiently into a structure such as that depicted in FIG. 1. Because the typical dimension of a prism facet in FIG. 1 is on the order of 0.5–1.0 mm, the apertures of the optical elements should be similarly sized to preserve the compactness of the overall module. The maximum size of the optical beam must be slightly smaller than the dimensions of the optical elements to avoid transmission losses from aperturing of the beam. As will be discussed below, other manufacturing considerations specific to the prism coupling application impose more stringent limits on the maximum beam size. For efficient prism coupling, there is also an optimum beam size (related to the properties of the evanescent coupling layer, as discussed above), and a minimum beam size so that the beam remains collimated as it traverses the prism structure and intersects the prism coupling surface.

If a suitable maximum beam size is selected, the tolerances associated with manufacturing a device such as that shown in FIG. 1 can be more easily accommodated. In particular, significant benefits regarding tolerances on the launch angle of input beam I and the thickness of evanescent coupling layer 26 can be realized.

As known from the prior art, for an evanescent coupling layer of constant thickness, an optimum coupling efficiency of 80% can be obtained when $\alpha\omega_{PCS}$=0.68. α, which has the units of inverse length, is a parameter representing coupling strength and appears as a characteristic constant in the profile of the output beam from the output facet of the prism structure, which has the form $g(z) \propto \exp(-\alpha z)$. The parameter α is primarily determined by the evanescent coupling layer thickness, the propagation constant in the evanescent coupling layer, and the phase shifts due to reflection at the two boundaries of the waveguide.

If the product $\alpha\omega_{PCS}$ is set to 0.68 to optimize coupling, then, as $\omega_{PCS}$ is decreased in value, α must increase, corresponding to stronger coupling or a thinner evanescent coupling layer. The increased coupling strength results in a broader resonance, and a broader resonance permits a wider range of wavelengths, or equivalently input angles, to be coupled into the waveguide. In fact, the full-width at half-maximum (FWHM) of the Lorentzian profile of the resonance in β-space (where β denotes the propagation constant) is directly proportional to α, according to the relationship:

$$FWHM(\beta) = FWHM(n_{Si} \sin \theta_{Si}) = \alpha\lambda/\pi.$$

By multiplying numerator and denominator by $2\omega_{PCS}$, and by using the relation:

$$\theta_{Si} = \theta_{pr} - \sin^{-1}\{\sin \theta_{air}/n_{Si}\},$$

it can be shown that the full-width at half-maximum as a function of input angle $\theta_{air}$ is:

$$FWHM(\theta_{air}) = (2\lambda/\pi)^*((\alpha\omega_{PCS})/2\omega_{PCS})^*F(\theta_{air}, \theta_{pr}),$$

in which:

$$F(\theta_{air}, \theta_{pr}) = \{1-(\sin \theta_{air}/n_{Si})^2\}^{1/2}/[\cos(\theta_{air})^*\cos\{\theta_{pr}-\sin^{-1}(\sin \theta_{air}/n_{Si})\}].$$

For a specific device configuration, such as that shown in FIG. 1, $\theta_{pr}$ and W (the waveguide thickness) are fixed quantities, $(\theta_{pr})_o$ and $W_o$ respectively. In addition, if a specific wavelength $\lambda_o$ is selected, then the center value of $\theta_{air}$ is also set at a particular value $(\theta_{air})_o$ (as shown in FIG. 4). In this case, the full-width at half-maximum intensity with respect to small variations in $\theta_{air}$ (the external launch angle into the prism structure) is given by:

$$FWHM(\theta_{air})=(2\lambda_o/\pi)*((\alpha\omega_{PCS})/2\omega_{PCS})*F((\theta_{air})_o, (\theta_{pr})_o).$$

This shows that the intensity distribution over a range of input angles increases linearly with the parameter $\alpha\omega_{PCS}$ that determines the coupling efficiency, and increases with the inverse of the projection of the beam diameter on prism coupling surface 15. For a given value of coupling efficiency $\alpha\omega_{PCS}$, the intensity distribution over a range of input angles can be increased by decreasing the projection of the input beam diameter on prism coupling surface 15. Also, by slightly increasing the value of the coupling constant $\alpha\omega_{PCS}$, the intensity distribution over a range of input angles can be increased with only small decreases in coupling efficiency. From a manufacturing standpoint, it is important to select appropriate values for both the coupling constant $\alpha\omega_{PCS}$ and the beam projection $\omega_{PCS}$, so that the final device will be more robust to small changes in $\theta_{air}$ that may occur over the lifetime of the device. An example below illustrates the range of beam sizes and variations in input angle that are compatible with high coupling efficiency.

Figure 6:
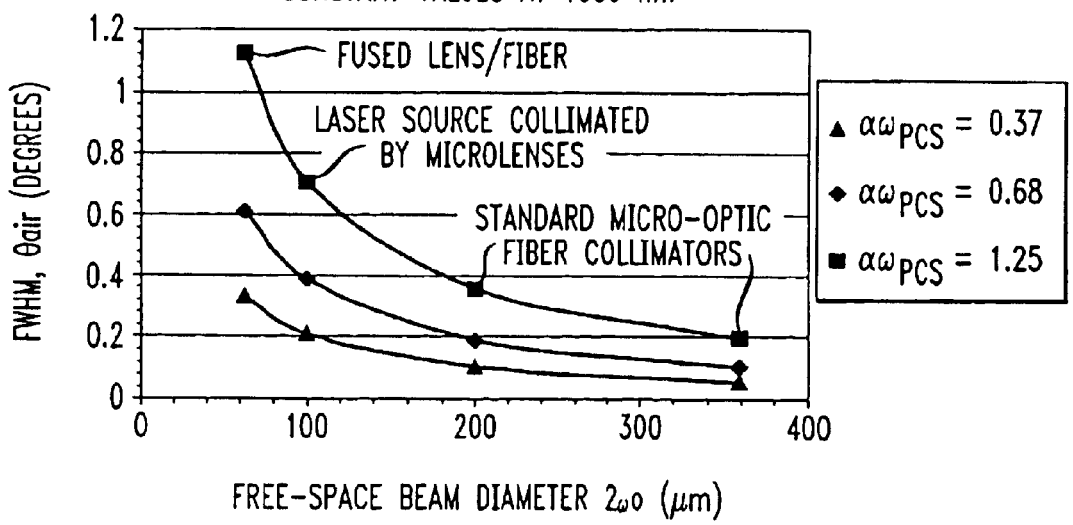
FIG. 6 illustrates the angular full width at half maximum of the coupling efficiency curve (denoted by FWHM($\theta_{air}$)), over a range of free-space input beam diameter values, and at three different values of the coupling constant $\alpha\omega_{PCS}$.

FIG. 6 shows $FWHM(\theta_{air})$ as a function of four free-space beam diameter $(2\omega_o)$ values, and for three different coupling efficiency $(\alpha\omega_{PCS})$ values. The four beam sizes that are chosen correspond to the following cases: (1) 63 μm: a standard output beam size for a lensed fiber assembly; (2) 100 μm: a typical beam size for vertical-cavity surface-emitting lasers (VCSELs) with micro-lenses integrated in the laser package; (3) 200 μm: the smallest beam size available in a standard fiber optic collimator (fiber/ferrule assembly aligned to a GRIN or aspheric lens;) and (4) 360 μm: most commonly used beam size for a standard fiber optic collimator (fiber/ferrule assembly aligned to a GRIN or aspheric lens). To calculate the coupling efficiency and the full-width at half-maximum for variations in the input launch angle, the projection of the beam on the prism coupling surface, $2\omega_{PCS}$, is calculated from the free-space beam diameter $2\omega_o$ using the equations discussed above. Next, the effects of varying the coupling efficiency by adjusting the value of $\alpha\omega_{PCS}$ is considered. If the evanescent coupling layer is thicker than the optimal value for a given beam size, the system will be undercoupled, meaning that $\alpha\omega_{PCS}$ is less than the optimum value of 0.68. For a value of $\alpha\omega_{PCS}=0.37$, 72% coupling efficiency can still be achieved for the embodiment of FIG. 1. In terms of tolerance on the input angle, this is an undesirable condition because the resonance is sharper and the tolerance to variations in $\theta_{air}$ is less than that associated with optimal coupling. For the device of FIG. 1 operated at 1550 nm, a coupling efficiency of 72% in the undercoupled regime corresponds to an evanescent coupling layer that is about 40 nm too thick (see FIG. 7). It can be seen that $FWHM(\theta_{air})$ will generally not exceed 0.35° for any realizable configuration at this coupling value. At optimal coupling, $\alpha\omega_{PCS}=0.68$, FWHM $(\theta_{air})$ has increased to 0.4°–0.6° for $2\omega_o<100$ μm, while remaining at approximately 0.1°–0.2° for the larger beam diameters. Now consider the case where the evanescent coupling layer is about 40 nm too thin, so that the over-coupled case with a coupling efficiency of 72%, $\alpha\omega_{PCS}=1.25$, is achieved. From FIG. 6, it can be seen that the angular tolerance has improved significantly to 0.7°–1.1° for $2\omega_o<100$ μm, while reaching about 0.2°–0.35° for the larger beam diameters. Thus, after the free-space optics have been aligned, using small beam diameters in moderately over-coupled devices can yield devices that are significantly less sensitive to small changes that may occur during device operation (due to temperature variation) or from device aging.

Additional benefits resulting from the use of a relatively small beam diameter derive from the limited physical extent of the interaction of the light beam with the evanescent coupling layer. The thickness of the evanescent coupling layer must be very carefully controlled to achieve high coupling efficiency. Variations in layer thickness translate directly into variations in α, shifting the value of $\alpha\omega_{PCS}$ away from the optimum value of 0.68. As an example, in FIG. 7 the coupling efficiency is shown for the preferred embodiment detailed in FIG. 1 as a function of the thickness of a silicon dioxide evanescent coupling layer 26 for three different thicknesses of waveguide layer 12. The evanescent coupling layer thickness is assessed for an application wavelength of 1550 nm and an input free space beam diameter of 63 μm. The range of device layer thicknesses shown in the graph represents the actual spread in layer thickness that is expected for state-of-the-art silicon-on-insulator processes. The target device layer thickness is 0.14 μm, as shown in the preferred embodiment. It can be seen from the graph that the evanescent coupling layer thickness must fall within ±20 nm of the target value, about 320 nm in this example, to avoid decreasing the coupling efficiency by 10% (if the tolerance on the thickness of waveguide layer 12, ±0.01 μm, is taken into account). Nonetheless, the ±20 nm tolerance must be maintained over the entire physical extent of the beam projection upon the prism coupling surface to ensure high coupling efficiency. This requirement may be more easily met if: (1) the medium comprising the evanescent coupling layer is chosen so that coupling efficiency curve of FIG. 7 has an appropriate breadth; (2) the process of attaching the prism coupler to the waveguide surface of the SOI wafer permits the thickness tolerance to be maintained over the physical extent of the beam projection; and (3) the physical extent of the beam projection upon the prism coupling surface is relatively small.

Figure 7:
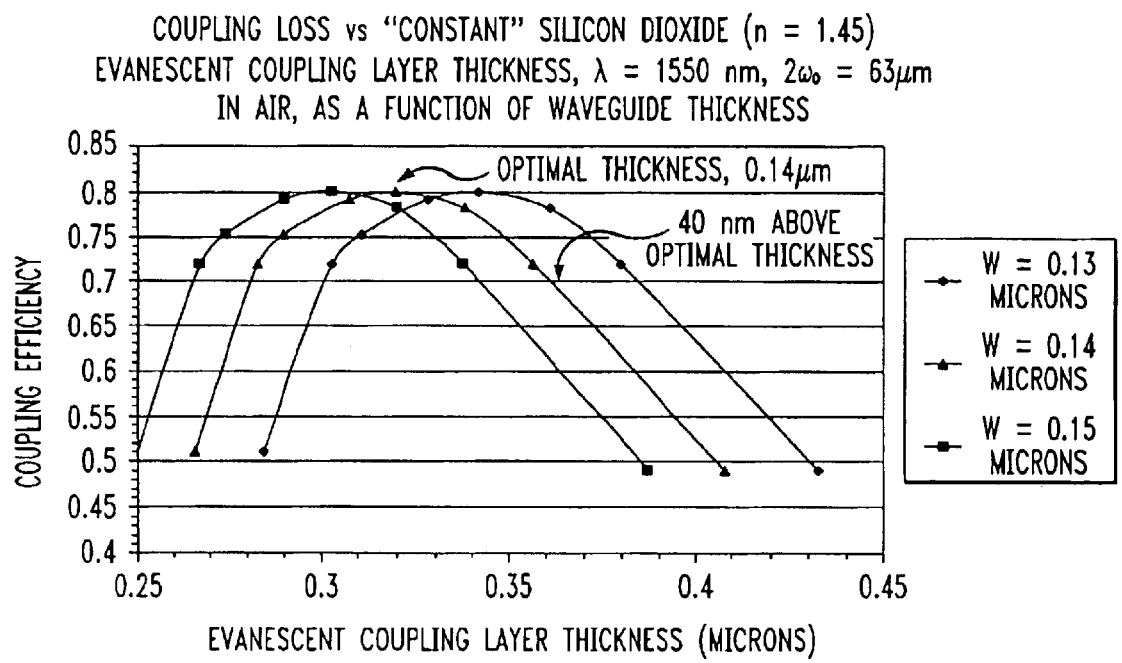
FIG. 7 illustrates the simulation of the coupling efficiency as a function of silicon dioxide evanescent coupling layer thickness for the embodiment depicted in FIG. 1, for three different thicknesses of the waveguide layer in the SOI wafer.
Figure 8:
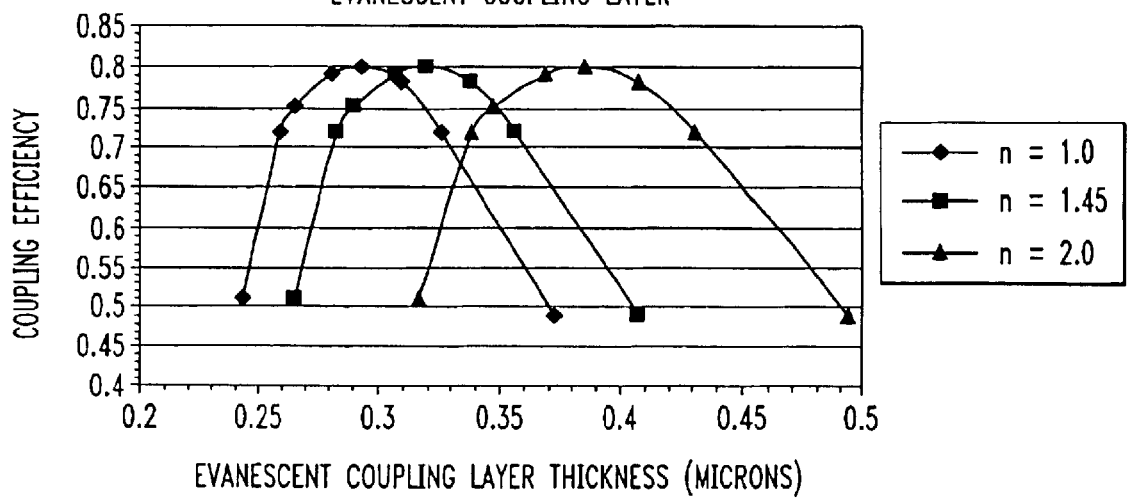
FIG. 8 shows the simulation of the coupling efficiency as a function of evanescent layer coupling thickness for embodiments similar to that shown in FIG. 1, for three different materials comprising the evanescent coupling layer.

FIG. 8 shows a similar analysis to FIG. 7, but displays coupling efficiency as a function of evanescent coupling layer thickness for three different refractive index values of the evanescent coupling layer. The three values represent three different exemplary media: air (n≈1.0), silicon dioxide (n≈1.45), and silicon nitride (n≈2.0). The basic form of the coupling efficiency curve is the same in all three cases, but it is clear that the optimum evanescent coupling layer thickness changes and the width of the coupling efficiency curves broaden slightly with increasing refractive index of the evanescent layer. Referring to FIG. 8, with n=2.0, the evanescent coupling layer thickness must fall within ±25 nm of the target value, about 385 nm in this example, to avoid decreasing the coupling efficiency by 10% (if the tolerance on the thickness of the silicon waveguide layer (take waveguide layer label from FIG. 1), ±0.01 μm, is taken into account). For this reason, small benefits might be obtained from using an evanescent coupling layer with higher refractive index. It is interesting to note that all three media (air, silicon dioxide, and silicon nitride) perform well in the context of the current embodiments provided that the correct evanescent coupling layer thickness is obtained. The indicated coupling curve widths (±20 nm for silicon dioxide, ±25 mn for silicon nitride) correspond to a ±6–7% tolerance in the evanescent coupling layer thickness, a value that is compatible with current state-of-the-art manufacturing methods.

Figure 9:
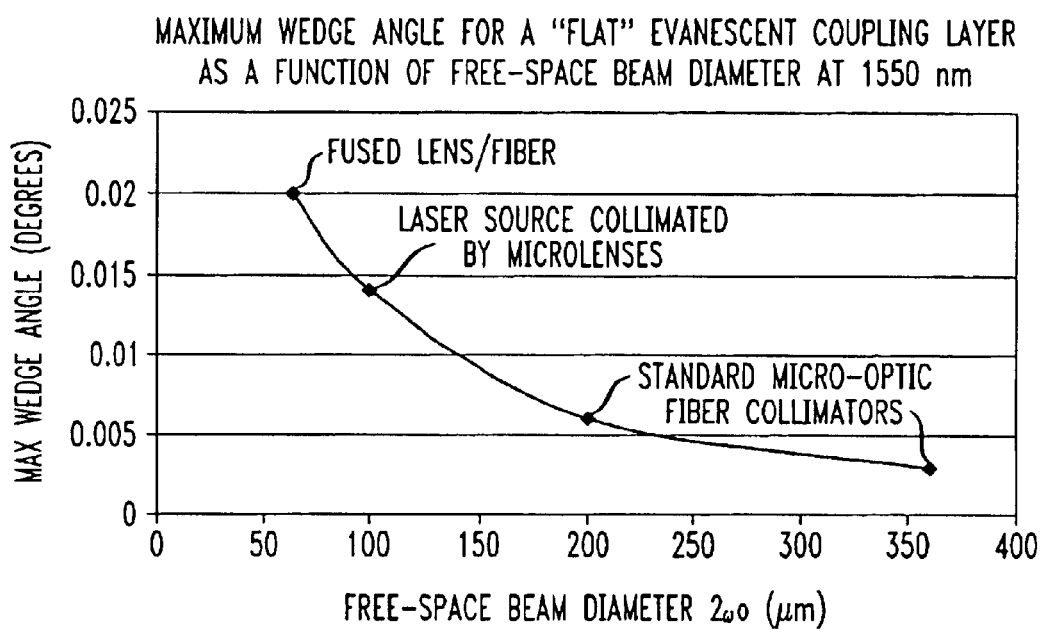
FIG. 9 shows the graphs of the maximum deviation from the flatness (in terms of a "wedge angle") consistent with the theoretical model of an evanescent coupling layer of constant thickness for the embodiment of FIG. 1, as a function of free-space input beam diameter.

For the device configuration illustrated in FIG. 1, the largest dimension of the projection of the input beam on the coupling surface ($2\omega_{PCS}$) is about 110 μm if a free-space input beam diameter ($2\omega_o$) of 63 μm is delivered to the input prism facet (for a wavelength of 1550 nm, a waveguide thickness of 0.14 μm, and a silicon dioxide evanescent coupling layer of approximately 320 nm in thickness). In addition, FIG. 7 shows that the thickness of the evanescent coupling layer may vary by ±20 nm and still maintain a coupling efficiency in excess of 70% for the same device configuration. During device manufacture, the prism coupling surface will generally not be perfectly parallel to the plane of the waveguide. A small deviation from parallelism results in an evanescent coupling layer with a thickness that varies slightly in magnitude across the prism coupling surface. FIG. 9 shows the deviation from parallelism that can be supported, for an embodiment such as that depicted in FIG. 1 with a range of input beam sizes, and still be consistent with a model of an evanescent coupling layer of "constant" thickness. As FIG. 7 shows, for the evanescent coupling layer to perform as a coupling region of essentially constant thickness, a maximum thickness variation of ±20 nm, or 40 nm total, that is present in the light coupling region can be supported. Thus, if the projection of the input beam on the prism coupling surface is 110 μm, the maximum permitted wedge is about 0.04 μm/110 μm=$4\times10^{-4}$ radians or 0.02°. If instead a silicon nitride evanescent coupling layer is used, a similar calculation will show that the maximum permitted deviation from flatness can be modestly increased to 0.026° for the free-space beam with a 62 μm diameter. If a larger beam size is used, the optimum thickness for the evanescent coupling layer increases in size, but the variation in thickness that permits high coupling efficiency remains essentially the same, around ±20 nm. For a free-space beam size ($2\omega_o$) of 360 μm, the corresponding projection of the beam on the prism coupling surface is approximately 610 μm for the device configuration of FIG. 1. A similar calculation shows that the permitted wedge angle has decreased to 0.04 μm/610 μm=$6.6\times10^{-5}$ radians, or 0.004°. Most of the improvement in wedge angle tolerance is due to the fact that the critical gap spacing needs to be maintained over a smaller distance for the smaller beam sizes. Because all the permitted wedge angles discussed are quite small, and decrease inversely with the projection of the beam on the prism coupling surface, the manufacture of a device such as that shown in FIG. 1 that can couple light efficiently is advantageously enhanced by designs that utilize relatively small beam sizes.

Figure 10:
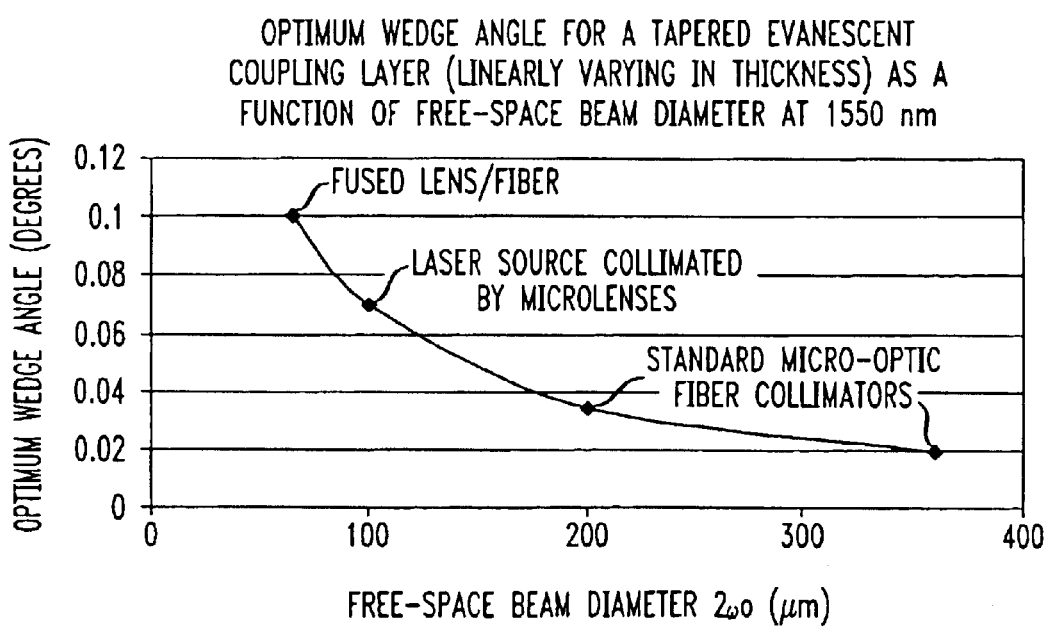
FIG. 10 shows the optimum "wedge angle" for an embodiment similar to FIG. 1, with a tapered evanescent coupling layer, as a function of free-space input beam diameter.

In a variation of the device construction shown in FIG. 1, a small variation in the thickness of the evanescent coupling layer along the input and output light coupling regions can be desirable to improve the coupling efficiency beyond 80%. It is known from the prior art that a graded thickness of the evanescent coupling layer, with a larger than optimal thickness in the light coupling region where the beam is first decoupled from the waveguide through the output prism, and a smaller than optimal thickness in the light coupling region where the last remaining light intensity in the waveguide is decoupled through the output prism, results in a output free-space beam profile which is substantially Gaussian in nature. This contrasts with the case of an evanescent coupling layer of constant thickness, for which the output beam profile is exponential. The improved mode matching between the Gaussian input beam and the substantially Gaussian output beam associated with the tapered evanescent coupling layer improves the theoretical coupling efficiency from 80% to approximately 97%. Without a detailed mathematical discussion, the basic information for calculating the appropriate wedge angle associated with the taper in FIG. 10 is available from FIG. 7. As discussed previously, the parameter α, which is related to the coupling strength and appears in the functional form of the output beam profile, is primarily determined by the evanescent coupling layer thickness. For a tapered evanescent coupling layer, with a layer thickness that varies along the direction of propagation in the waveguide (z), the coupling strength at a given z value is then directly related to the local value of α, α(z). The thickness of the evanescent coupling layer must change from weakly coupled (small α(z)) to strongly coupled (large α(z)) on a distance scale that is approximately equal to the projection of the input beam upon the prism coupling surface. To obtain high coupling efficiency, it is necessary to specify both an appropriate average thickness value (which produces an α value close to the optimum value of α appropriate for optimal coupling for a constant evanescent coupling layer) and an appropriate linear variation in thickness with z, or "wedge angle". For the example of FIG. 7, at W=0.14 μm, it can be seen that the coupling efficiency drops to about 37% (or 1/e) of its maximum value at evanescent coupling layer thicknesses of 250 nm and 450 nm. This corresponds to a total variation of 200 nm across the projection of the beam on the coupling surface. For the embodiment of FIG. 1 and the configuration specified in FIG. 7, the amplitude of the electric field associated with the input beam projection on the coupling surface drops to about 37% of its maximum value at ±55 μm (±$\omega_{PCS}$) from the peak value, for a total projected beam length of 110 μm. From the general theory and the specific overlap integration known from the prior art, it can be inferred that this match will lead to a high degree of overlap between the output and input beams. The optimum slope of the linearly varying gap is then given by 200 nm/110 μm=$1.8\times10^{-3}$ rad=0.1°. Note that this condition applies for the relatively small—but achievable—free-space beam diameter of 63 μm. If a silicon nitride evanescent coupling layer is used (FIG. 8, with n≈2.0) instead of silicon dioxide, the optimal slope is modestly increased to 0.13° for the free-space beam with a 63 μm diameter.

FIG. 10 shows the optimum wedge angle as a function of free-space beam size, performing the exact same calculation as above for the beam sizes used in the computations shown in FIG. 9. Note that the optimum wedge increases by a factor of 6–7, from 0.02° for a free-space beam size of 360 μm to 0.10° for the 63 μm beam diameter. Again, most of the improvement in tolerance is due to the fact that the critical thickness variation needs to be maintained over a smaller distance for the smaller beam sizes.

Because the desired wedge angles for both the constant thickness and the graded-thickness evanescent coupling layer are relatively small, increases in the value of the wedge angle significantly increase the manufacturability of the final device. It can be seen from FIGS. 9 and FIG. 10 that improvements to the tolerances about the desired wedge angles start to be realized when the free space beam diameter decreases below 200 μm. More considerable benefits are realized when the free-space beam size is reduced below 100 μm.

While the previous discussions show that reducing the beam size significantly improves the manufacturability of the device for several reasons, the size and design of the prism coupler (as well as any preceding input optics) places constraints on the minimum beam size that is compatible with the design. Small diameter beams diverge rapidly over relatively small propagation distances. A commonly used figure of merit for this distance is termed the Rayleigh range (denoted herein by $z_R$), and defined by the relation $z_R = \pi n \omega_o^2 / \pi$, where n is the refractive index of the medium through which the beam propagates, and the other symbols are as defined above. Physically, the Rayleigh range roughly corresponds to the distance over which the beam remains collimated. In order to obtain high coupling efficiency if prism structures are used to transfer the light from an external source to a waveguide, the beam waist must be located in the vicinity of the projection of the input beam upon the prism coupling surface. The beam must propagate some distance through the silicon prism coupler, and often through air and other input optics, prior to intercepting the prism coupling surface. If the beam size is too small, the permitted path length through air, input optics, and silicon will be too short to be practically realizable. An exemplary calculation, discussed specifically in the context of a device construction such as FIG. 1, now follows.

If the prism structure depicted in FIG. 1 has a base dimension of 0.45 mm (measured from the deepest part of the v-groove horizontally across to a corner edge created by an etch process), and 1550 nm light is launched at a $\theta_{Si}$ value of 45.5° within the silicon prism coupler, the beam must traverse a path length of approximately 400 μm from the input prism facet to the corner of the prism structure and the prism coupling surface. The launch distance prior to the prism facet, which includes the path length of the beam in air, as well as the thickness of optical elements used to pre-process the optical beam, must also be included in the calculation of the beam waist position. Depending on the required number of elements, the beam path length prior to the input facet can range from about 1 mm (a reasonable manufacturing tolerance for device alignment) to several mm. Because the refractive index of air (and generally the refractive index of the input optics) is considerably lower than that of silicon, and the fact that the path length prior to the prism facet will often exceed the path length in the silicon prism structure, the Rayleigh range calculation is dominated by the launch prior to the input prism facet. Using the relation for $z_R$ given above, it can be shown that for a beam diameter of 20 μm, the Rayleigh range in air is 0.2 mm and in silicon is 0.7 mm. For a larger beam diameter of 63 μm, the Rayleigh range in air is approximately 2.1 mm, and in silicon is 7.3 mm; for a beam diameter of 100 μm, the Rayleigh range in air is approximately 5.1 mm and in silicon is 17.6 mm. To achieve a transit distance in air on the order of one to several mm, the calculations show that it is feasible to use a beam size on the order of 60–100 μm.

Because exemplary micro-optic components such as polarization beam splitters, waveplates, and micro wedges or prisms are available with thicknesses of 0.5 mm or less, a number of elements can be employed to shape, steer, and adjust the polarization state of the optical beam after the collimating lens. Thus, beam sizes of 60–100 μm are compatible with the desire for a small beam, a miniaturized package, and an input train of micro-optic elements. It is desirable to choose a design range of input beam diameters on the order of 60–100 μm to simplify the packaging and other assembly aspects discussed previously.

Figure 11:
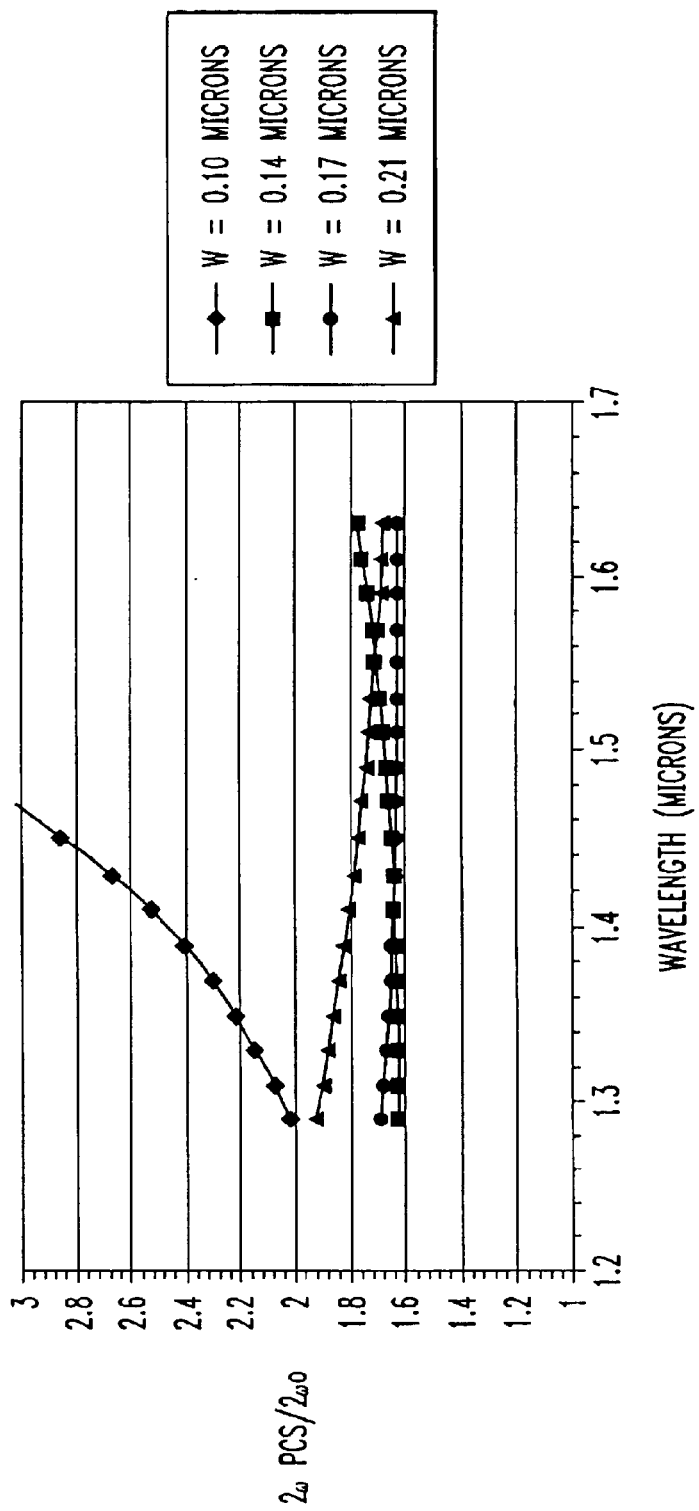
FIG. 11 illustrates the ratio of the size of the input beam on the prism coupling surface ($2\omega_{PCS}$) to the size of the input free-space beam ($2\omega_o$) over a range of telecommunications wavelengths for the embodiment of FIG. 1, for four different thicknesses of the waveguide layer in the SOI wafer.

A final consideration concerning the input beam size is the lower limit on the beam size imposed by the prism coupler, evanescent coupling layer, and waveguide. The properties of all three components determine the angle of the beam inside the prism, $\theta_{Si}$, and thus directly impact the projection of the beam on the prism coupling surface, $2\omega_{PCS} = 2\omega_{PR}/\cos\theta_{Si}$ (see FIG. 2). Moreover, the material and geometry of the prism coupler determine how the beam refracts at the input prism facet, according to the relation $2\omega_{PR} = 2\omega_o\{1-(\sin\theta_{air}/n_{Si})^2\}^{1/2}/\cos\theta_{air}$. It should be noted that in general, due to refraction at the angled surface and the projection at the coupling surface, $2\omega_{PCS} > 2\omega_o$, (the quantity $2\omega_o$ defining the beam diameter in free space). In a typical case, the projection of the beam on the prism coupling surface, $2\omega_{PCS}$, exceeds the free-space beam diameter $2\omega_o$ by a factor ranging from one to three;

FIG. 11 shows the enlargement of the beam upon the prism coupling surface due to these effects for various device layer thicknesses of FIG. 1 over the full range of telecommunications wavelengths. It can be seen that for most cases of interest, the beam is expanded along the axis of travel by a factor of 1.6–2.0. Larger values and more rapid increases of $2\omega_{PCS}/2\omega_o$ (such as W=0.10 μm for $\theta_{pr}$=54.74°) correspond to the increasing effect of refraction at highly oblique angles of incidence on the angled prism facet. For the same reason, these configurations are less desirable from a packaging standpoint. Thus, for practical purposes it will be assumed that the beam dimension at the prism coupling surface is expanded by a factor of 1.4–2.4 from the free-space value. Also, note that by selecting particular values of the waveguide thickness and prism angle (such as W=0.17 μm and $\theta_{pr}$=54.74°), the projection of the input beam on the coupling surface $2\omega_{PCS}$ can be made essentially independent of wavelength. This way, a suitable small beam size can be achieved for any wavelength in the range, which simplifies the design of the device. This permits a given prism wafer/evanescent coupling layer/waveguide configuration to be used with high coupling efficiency over a broader wavelength range than an arbitrary device configuration.

It is to be understood that variety of different components can be designed and assembled to generate, transmit, and modify a light signal, in order to achieve the desired set of beam characteristics in accordance with the present invention. The following discussion includes several exemplary configurations of light sources and trains of optical elements that can be employed to provide an advantageous interface to a device similar to that depicted in FIG. 1.

In addition, for some applications, characteristics of the prism coupler, evanescent coupling layer, and waveguide can be selected to simplify the interface to an external source or receiving element. In particular, some of the elements used to transmit and modify the input light signal can be formed within the prism coupler wafer or die itself, reducing the total number of separate components and simplifying the assembly process. By selecting appropriate materials, thicknesses, and geometries for the evanescent coupling layer and waveguide, favorable launch geometries and beam profiles can be attained, again simplifying the assembly process.

Laser diodes are exemplary light sources that are commonly used in optoelectronic devices designed for telecommunication wavelengths (1.1–1.65 μm). Many infrared laser diodes typically comprise a multilayer structure of gallium arsenide-based or indium phosphide-based materials, with light being emitted from a cleaved edge facet of the laser chip (referred to in the art as edge-emitting laser diodes). The laser diode can be utilized directly in this chip form, or, as in many packaging techniques well-established in the prior art, the laser chip can be interfaced to an output fiber through a series of optical elements. A second exemplary class of laser diodes is referred to in the art as vertical-cavity surface-emitting lasers, or VCSELs. Infrared VCSELs comprise a multilayer structure (using gallium arsenide, indium phosphide, or indium gallium arsenic nitride based materials) in which light is emitted perpendicular to the layer stack, and through the top surface of the device.

For some applications, it is desirable to transmit from a laser chip into the prism structure using purely free-space optics. Coupling directly to the laser can enable very compact packaging and provides a high degree of polarization control. However, due to the small dimensions of the emitting facet of the laser, and the relatively long infrared wavelength, the output beam can be strongly divergent. Edge-emitting laser diodes operating in the 1300–1600 nm range typically have a FWHM beam divergence perpendicular to the junction on the order of 32°–50°, and a FWHM beam divergence parallel to the junction on the order of 10°–25°.

Because the beam divergence is large and anisotropic, at least two lenses are required to provide effective free-space beam collimation with good wavefront quality. In one type of lens assembly, a pair of crossed cylindrical lenses are used to correct for astigmatism and produce collimation along both the slow and fast axes. To provide effective collimation for the highly divergent or "fast" axis, the first cylindrical lens is generally formed from a material with a graded refractive index (referred to in the art as a "GRIN" lens). The second cylindrical lens, which collimates the less divergent or "slow" axis, can be formed from a wider variety of optically transparent materials, as the lens shaping alone is sufficient to provide collimation. The output beam diameter emerging from a typical laser diode followed by a miniature GRIN rod lens can be selected to fall in the range from 40 μm to several mm. In a second configuration, the first lens is used to reduce the divergence angle perpendicular to the junction until it is equal in value to the divergence angle parallel to the junction, circularize the beam, and correct astigmatism. This lens type is sometimes referred to as a "laser diode corrector" or a "circularizer". The second lens can now be a conventional collimating microlens (to reduce the beam divergence to near zero), such as a plano-convex or aspheric lens, formed of a wide variety of optically transparent materials. The advantage of the second configuration is that only one specialized lens is required, rather than two. The output beam diameter emerging from a typical laser diode followed by a "corrector" lens can be selected to fall in the range of 100 μm to 1 mm.

VCSELs emit circular beams with a moderately divergent beam, such that the divergence angle ranges from 2° (for a lensed assembly) to 18°. The lens used can be a conventional collimating microlens (to reduce the beam divergence to near zero) such as a plano-convex or aspheric lens, formed of a wide variety of optically transparent materials. To produce a collimated beam with a small beam diameter, a integral microlens can be incorporated as part of the VCSEL structure itself. For a VCSEL active area with dimensions of about 3 μm, a collimated beam of 100–200 μm can be produced in this manner. While mid-infrared wavelength VCSELs (1270–1650 nm) are just starting to become available, their use is potentially advantageous in reducing the number of components and the complexity of the optoelectronic package.

In other applications, a length of fiber can serve as a conduit that delivers the light from the laser source to the prism coupler. If the laser source is housed in a separate enclosure with a fiber output, the prism-coupled waveguide device should be provided with an input fiber assembly that can be mated directly to the fiber output of the laser source. (If several optical devices are located between the laser source and the prism-coupled waveguide device, then it is understood that the input fiber assembly of the prism-coupled waveguide device is mated to the terminating fiber output in the chain). If the laser source is incorporated in the same package as the prism-coupled waveguide device, it can still be beneficial for some applications to use intervening fiber between the laser chip and the prism coupler. For example, a wider range of collimated beam sizes and profiles can be realized with a specially terminated fiber. The special termination, which would be employed on the fiber end closest to the prism coupler, often consists of shaping a fiber end, or fusing a miniature lens directly to the end of a fiber. By varying the size and radius of curvature or aspherical profile of the fiber end or lens, a collimated beam of a minimum spot size (also known as "beam waist") at a user-specified working distance can be produced. Using state-of-the-art technology, fiber collimators with beam waist diameters ranging from about 15 μm to 100 μm can be readily manufactured in this manner. The laser source can be interfaced to the other end of the fiber length using lens assemblies that are well documented in prior art. Thus, for the configurations of FIGS. 13, 14 and 15, a beam diameter of 60 μm can readily be produced from the output of the fused lens/fiber assembly for both fiber and laser inputs.

While the lens assemblies provide the necessary beam collimation, it is still necessary to ensure that the beam has the desired polarization state prior to entering the prism. Although the transverse electric (TE) and transverse magnetic (TM) polarization states can both be coupled with high efficiency into the waveguide, only one polarization state can be coupled with high efficiency at a particular value of $\theta_{Si}$. Because an edge-emitting laser diode will emit a beam with a stable and known polarization state, a micro-waveplate can be used to rotate the polarization to the desired state. For some applications, it may be possible to omit the waveplate entirely by choosing the desired polarization state to coincide with that emitted from the edge-emitting laser diode. If the input is transmitted through a polarization-maintaining fiber, the fiber can be rotated at the time of assembly to ensure that the desired polarization state is obtained, again negating the need for additional polarization optics.

Figure 12:
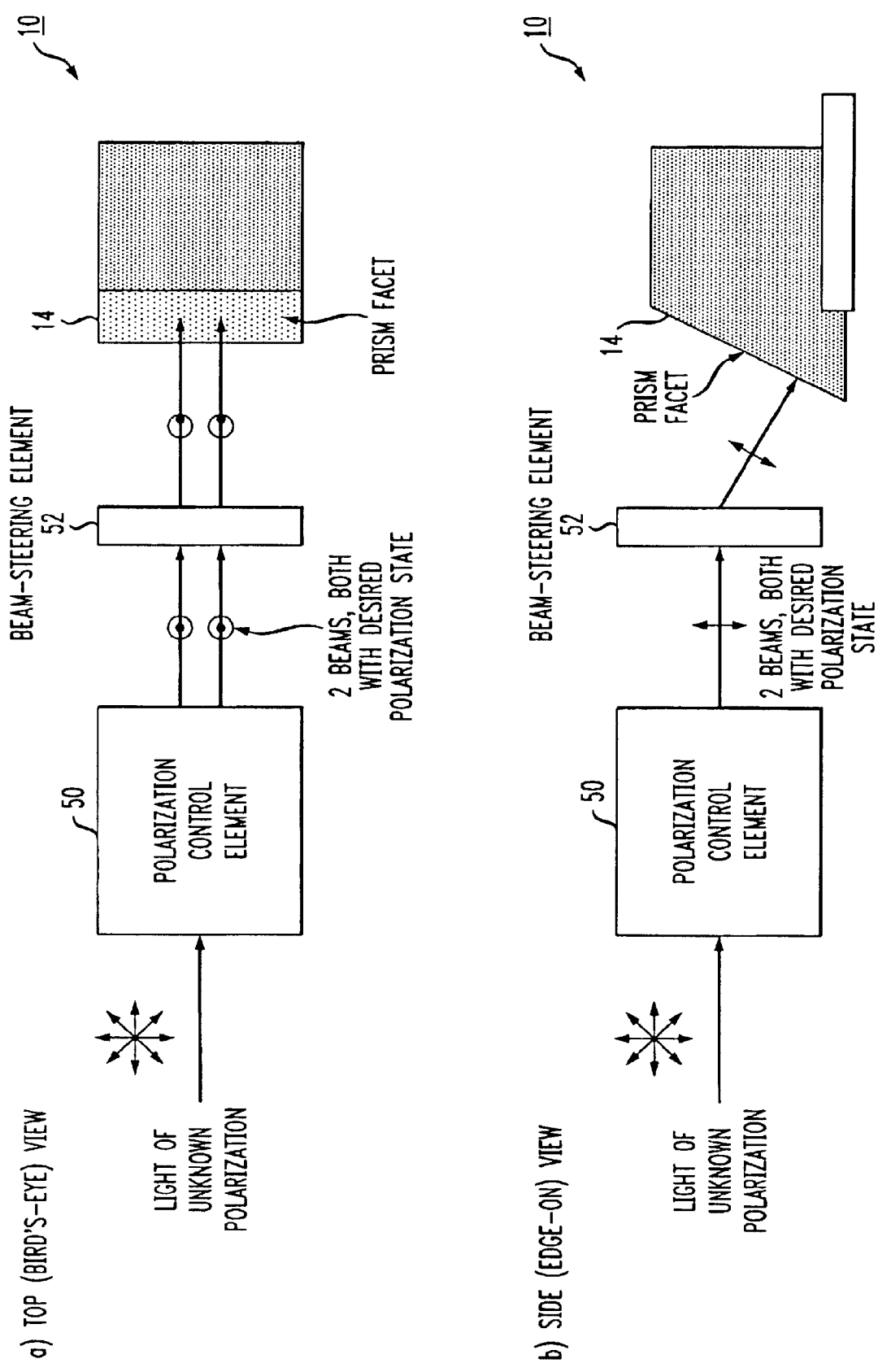
FIGS. 12(*a*) and (*b*) illustrate schematically in top view perspective and side view perspective how an initially unpolarized input beam can be converted into two separate beams of the desired polarization, thus permitting high coupling efficiency of light into a waveguide via a prism structure.

However, the polarization state of a VCSEL is not so well-known. In particular, the polarization state may be stable over time, but of unknown direction or, alternatively, the polarization state may change with time or with laser drive current. Similarly, if non-polarization-maintaining input fiber is used, the polarization state of the light is unknown and will drift over time. A component that has been employed in prior art optical circulators can also be utilized in the present invention to produce the correct polarization state, as shown in FIG. 12. An input beam is delivered to a birefringent element 50 that separates the single input beam into two polarized beams: one with the desired polarization, and the second orthogonal to the desired polarization. Because the refractive index is different for the two polarization states, the two beams initially propagate in different directions within device 50. The beam with the desired polarization state continues to propagate through a medium that does not affect its polarization state. However, the beam that is orthogonal to the desired polarization state is passed through a second birefringent element, a beam steering element 52, that rotates its polarization 90° to the desired polarization state. The final output is two separate optical beams, slightly offset from each other, and both with the desired polarization state. In most applications, the two elements 50 and 52 are physically bonded to each other, creating one optical sub-assembly for ease of alignment and manufacture. Either naturally birefringent materials (such as YvO$_4$, quartz, rutile, or lithium niobate) or artificial birefringent elements (such as sub-wavelength diffractive optics) can be used. If the polarizing assembly is oriented such that both beams impinge on the prism facet 14 at substantially the same angle of incidence, both can be coupled with high efficiency into waveguide layer 12. For some applications, it is desirable to recombine the beams after they have entered waveguide layer 12. This recombination is most easily accomplished by appropriate guiding structures within SOI waveguide layer 12 itself.

Once the input beam is collimated and the desired state of polarization is produced, the light signal must be launched at the appropriate angle of incidence $\theta_{air}$ on the prism facet if light of the desired wavelength is to be coupled efficiently into the waveguide. For an embodiment such as FIG. 1, the beam could be launched directly at the angle $\theta_{air}$ into the prism structures or, alternatively, small optical elements can be used to re-direct an incoming beam to the angle of incidence $\theta_{air}$ upon the prism structure. For packaging reasons, it is often convenient to have the light launched parallel to the wafer for edge-emitting diode sources, fiber inputs, or vertical-cavity surface-emitting lasers (VCSELS) ($\theta_{air}$=-35.3° for a direct launch). It is also desirable to launch perpendicular to the waveguide ($\theta_{air}$=54.74° for a direct launch) for an external source such as a VCSEL. From FIG. 4, it can be seen that by choosing the appropriate waveguide thickness for a given wavelength, the appropriate launch condition can be selected. However, for some designs the required waveguide thickness for a specific launch angle may be incompatible with competing device requirements. For these reasons, it is desirable to have some beam-steering optics packaged in the vicinity of the source. In addition to the angle selection, beam-steering optics may be used with other alignment techniques (such as positioning of the source relative to the prism) to ensure that the beam is properly positioned (translationally) on the prism.

Figure 13:
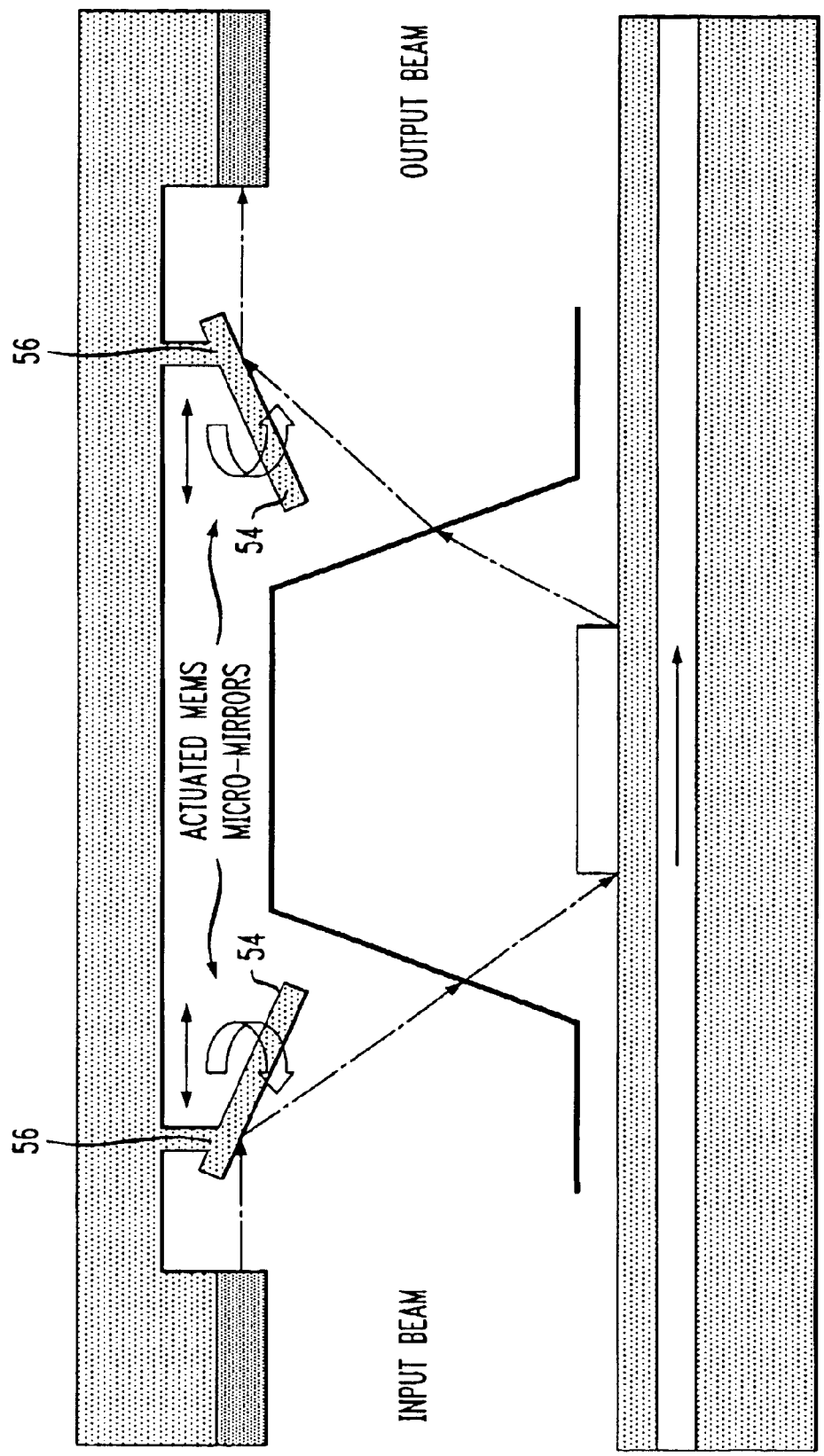
FIG. 13 shows an example of using actuated MEMs micro-mirrors to steer the beam from a horizontal light launch to the appropriate launch angle exterior to the prism.
Figure 14:
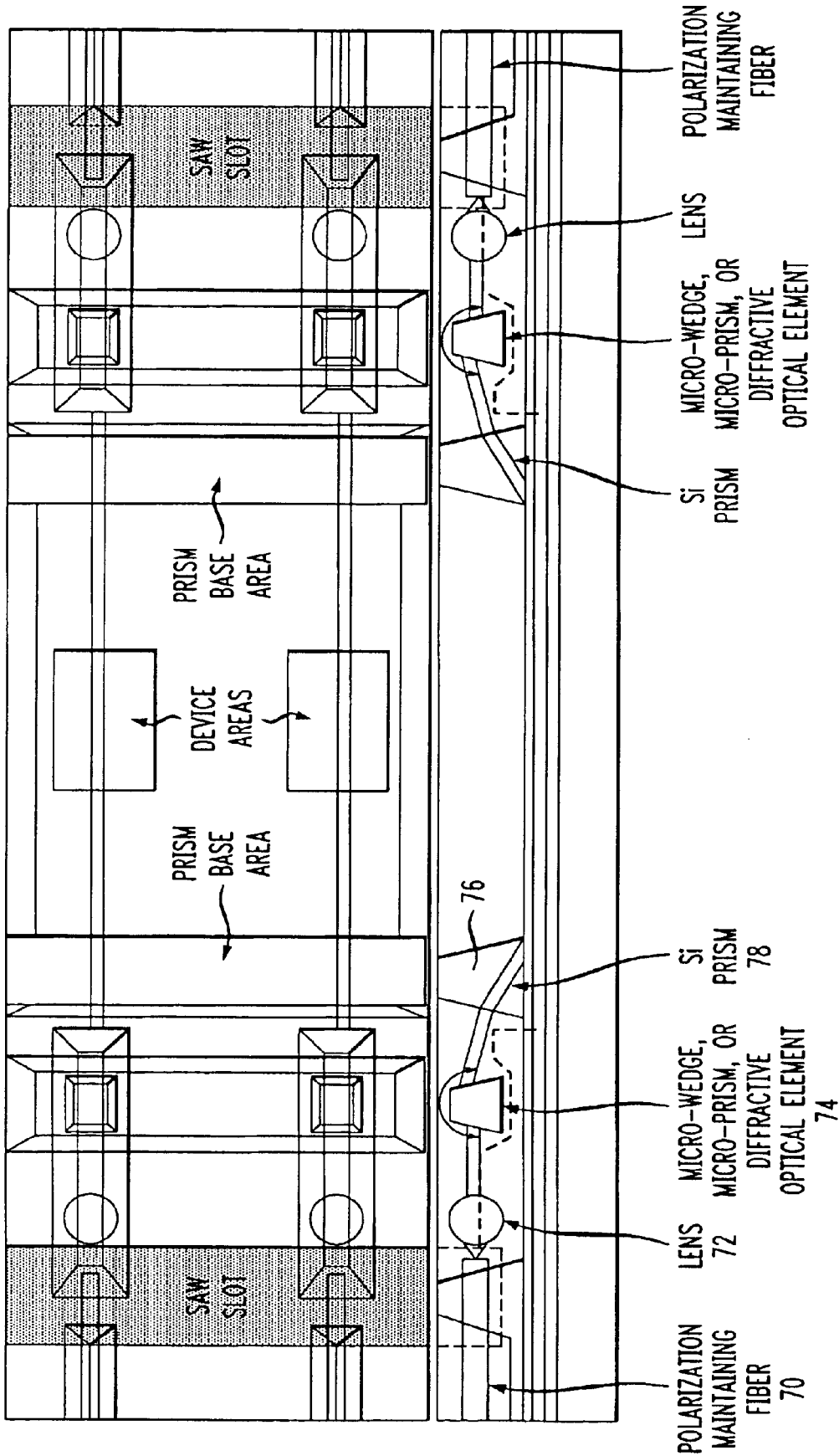
FIG. 14 illustrates a physical layout demonstrating a side launch of light from a fiber pigtailed edge-emitting diode or other fiber input into the device, with the outputs on the opposite side of the package.
Figure 15:
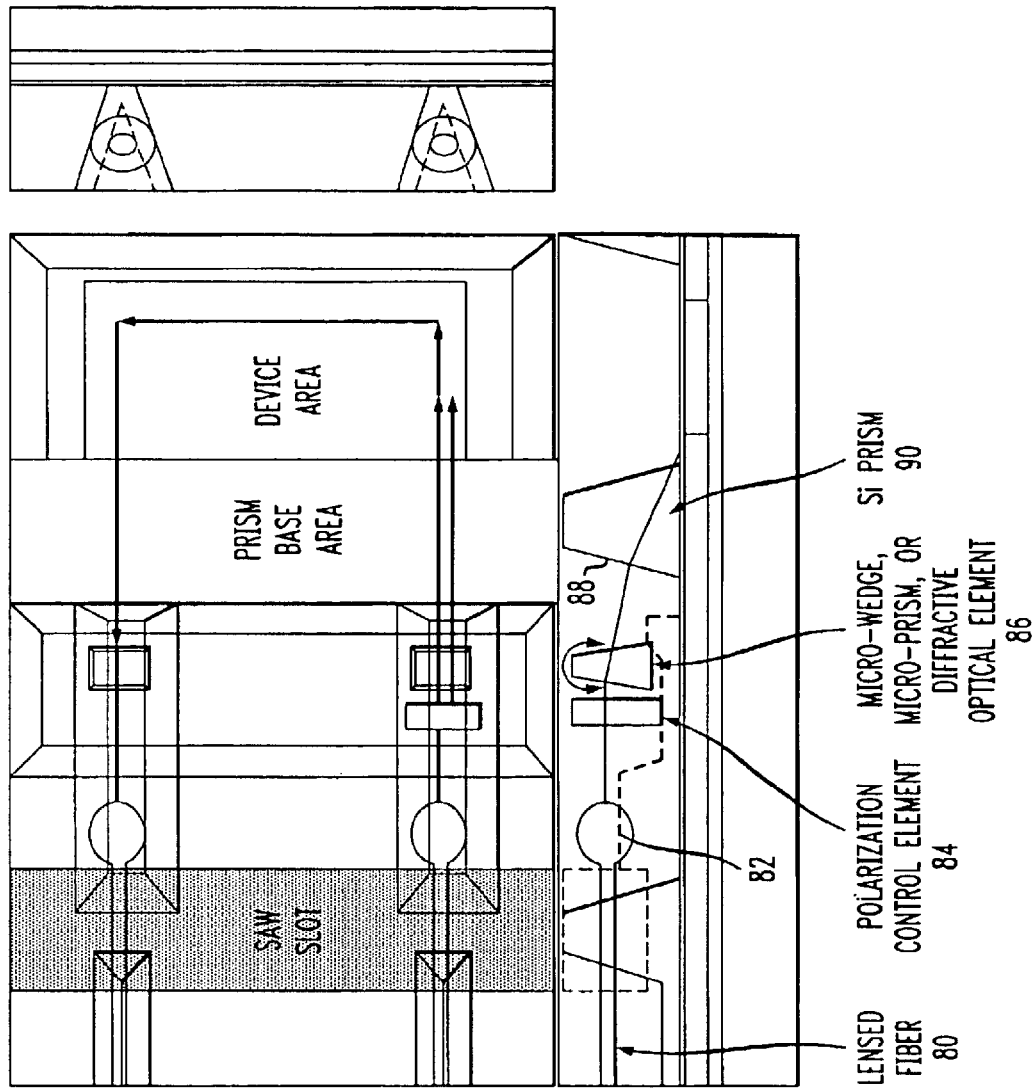
FIG. 15 illustrates a physical layout demonstrating a side launch of light from a fiber pigtailed edge-emitting diode or other fiber input into the device, with the outputs on the same side of the package.

Exemplary methods of steering the beam from an edge-emitting diode or optical fiber to the prism facets are detailed in FIGS. 13, and 15. In FIGS. 14 and 15, a collimated free space beam from an edge-emitting laser diode or optical fiber is directed towards a micro-optic prism or wedge. The magnitude of the beam deflection increases with increasing refractive index and wedge angle of the micro-optic. A similar micro-optic can be used on the output side to direct the output beam to a receiving fiber. Alternatively, a diffractive optical element such as a linear phase grating can be used as a beam-steering element. Diffractive optical elements can be advantageous in beam-steering applications because the dispersion of an appropriately designed grating can be large, permitting large angles (up to 60°) of deflection. A second advantage is that a more complex diffractive optical element can perform more than one optical function simultaneously, providing improved performance with fewer components. As an example, in addition to serving as a beam-steering element, the diffractive optical element could be used to provide wavefront correction, improving the beam quality.

In FIG. 13, a micro-mirror 54 fabricated through micro-electrical-mechanical-systems (MEMS) processing is used to reflect the beam to the desired angle of incidence $\theta_{air}$. In the example depicted in FIG. 13, microhinges 56 fabricated-by silicon micromachining latch the mirror to the correct angle and position. An advantage of using this technology is that the position and angle of micro-mirror 54 are actuated and adjustable, allowing for tuning of both $\theta_{air}$ and the position of the beam relative to the etched corner to maximize the light transmitted to the waveguide. As before, the same structure can be employed on the output side to direct the output beam to a receiving fiber.

FIGS. 14–19 illustrate specific input and output optical configurations that can be interfaced with high coupling efficiency to prism-coupled waveguide devices. Although a particular optical component (for example, the lensed fiber 60 of FIG. 15) may be depicted in only one embodiment, it is to be understood that a given component can be advantageously employed in a variety of different embodiments. Thus, the embodiments detailed in FIGS. 14–19 are intended to be exemplary in nature, and do not provide an exhaustive set of the possible configurations.

FIGS. 14 and 15 show two conventional fiber-pigtailed optoelectronic package configurations that are interfaced to prism-coupled waveguide devices. While the prism structures and the SOI device wafer are joined to form one assembly, the packaging structures for the input and output optics trains can constitute a separate assembly. In this case, the optical elements are placed and aligned in mounts on a separate carrier, which in turn is mated and aligned to the prism/SOI device waveguide assembly. Alternatively, if the prism structures are formed in a silicon wafer, additional masks and etch processes can be used to define grooves for mounting free-space elements in the surface of the silicon wafer opposite from the mating surface. In both cases, channels or grooves with dimensions roughly equal to the outer dimensions of the optical elements (or housings in which the elements are contained) are formed in the substrate material. The free-space optical elements are then positioned, aligned, and secured at designated positions in the channels. In both FIGS. 14 and 15, the optical signal is introduced to and extracted from the package with an optical fiber (referred to in the art as "fiber-pigtailed").

In FIG. 14, two separate devices are featured in the fiber-pigtailed optoelectronic package, with input fiber connections on one side of the package and output fiber connections located on the opposing side. In the embodiment depicted in FIG. 14, polarization-maintaining fiber 70 is employed, so that the correct polarization state is realized without any additional polarization optics. A micro-optic lens 72 (such as a miniature asphere, a miniature GRIN lens, or a miniature ball lens) is used to collimate the beam diverging from the fiber, and the collimated beam is then directed to a beam-steering element 74 that deflects the beam to the correct angle of incidence $\theta_{air}$ on the input facet 76 of prism 78. If beam-steering element 74 is further positioned on a separate sub-mount with the rotational degree of freedom illustrated in FIG. 14, the angle of incidence may be adjusted or "tuned" at the time of assembly, and then fixed for the lifetime of the device. On the output side of the device, the output beam traverses the same sequence of optical elements in reverse order. While it is not strictly necessary to have polarization-maintaining fiber on the output side of the device, the use of polarization maintaining fiber allows for the structure of FIG. 14 to be used as a bi-directional system.

The embodiment of FIG. 15, which is similar to that of FIG. 14, shows a packaged device with input and output ports located on the same side of the package. This particular configuration can be advantageous when the size of the overall package must be kept to a minimum. As shown in FIG. 15, the direction of beam propagation is reversed by reflective optical elements that are located within the waveguide layer of the SOI wafer. The light signal is introduced to the device through an optical fiber 80 located at the bottom of the package. In this configuration, a miniature lens 82 is fused directly to optical fiber 80, providing a well-collimated beam in a single sub-assembly. Because the beam does not have a well-known state of polarization after exiting the lensed fiber, a polarization control element 84 is employed to convert the input beam into two beams with the desired polarization state. Polarization control element 84 is oriented such that the two output beams are displaced horizontally (that is, the plane containing both beams is parallel to the plane of the wafer). As the separation distance between the two beams is relatively small, on the order of a few hundred microns, both beams can be deflected with the same beam-steering element 86. Both beams are delivered to the input facet 88 of prism 89 at substantially the same angle $\theta_{air}$, and are coupled into the waveguide layer 12 of the SOI wafer. The two beams are phase-shifted with respect to each other and then recombined into a single beam by optical elements that are located in the waveguide layer. After traversing the remaining optoelectronic structures in the SOI waveguide layer, the output beam exits the output prism facet and propagates through a similar optical output train. However, the polarization control element can be omitted on the output side, unless it is necessary to recreate an unpolarized output beam.

Figure 16:
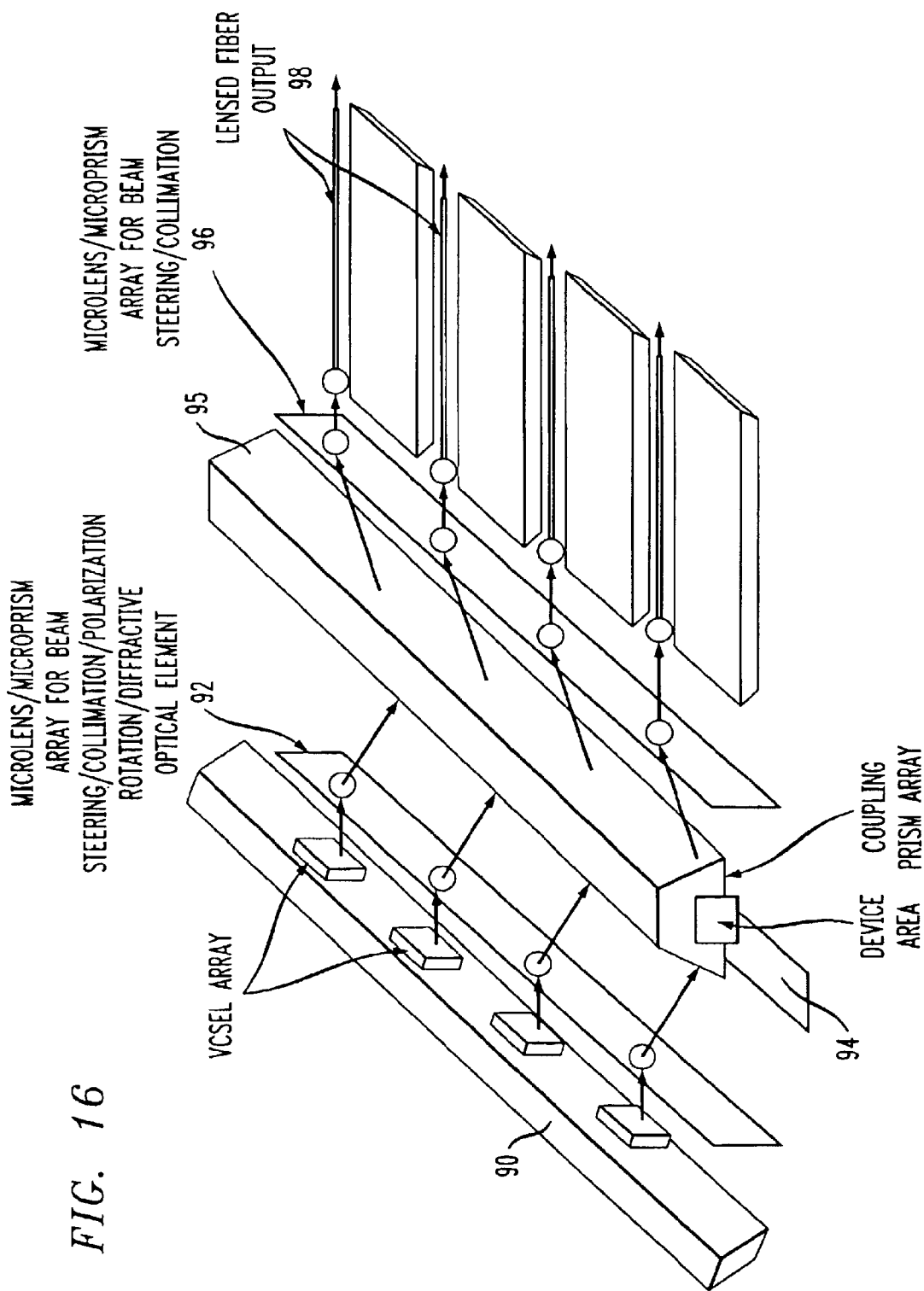
FIG. 16 shows an example of using arrayed VCSEL sources and microlens/prism arrays to steer the beam to a bar of prism structures.
Figure 17:
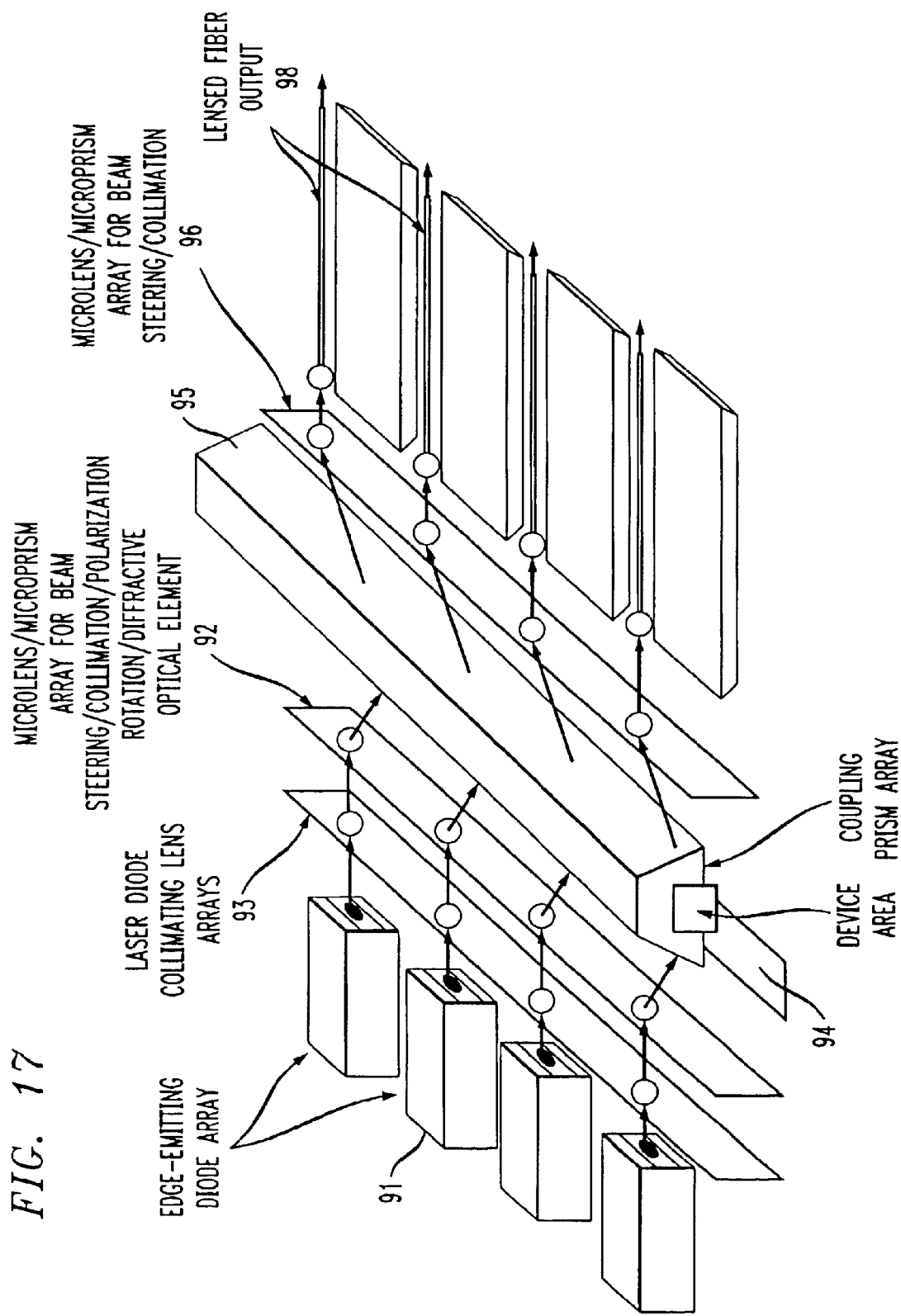
FIG. 17 is an alternative embodiment to the arrangement of FIG. 16, where an edge-emitting diode array is used in place of the arrayed set of VCSEL sources.
Figure 18:
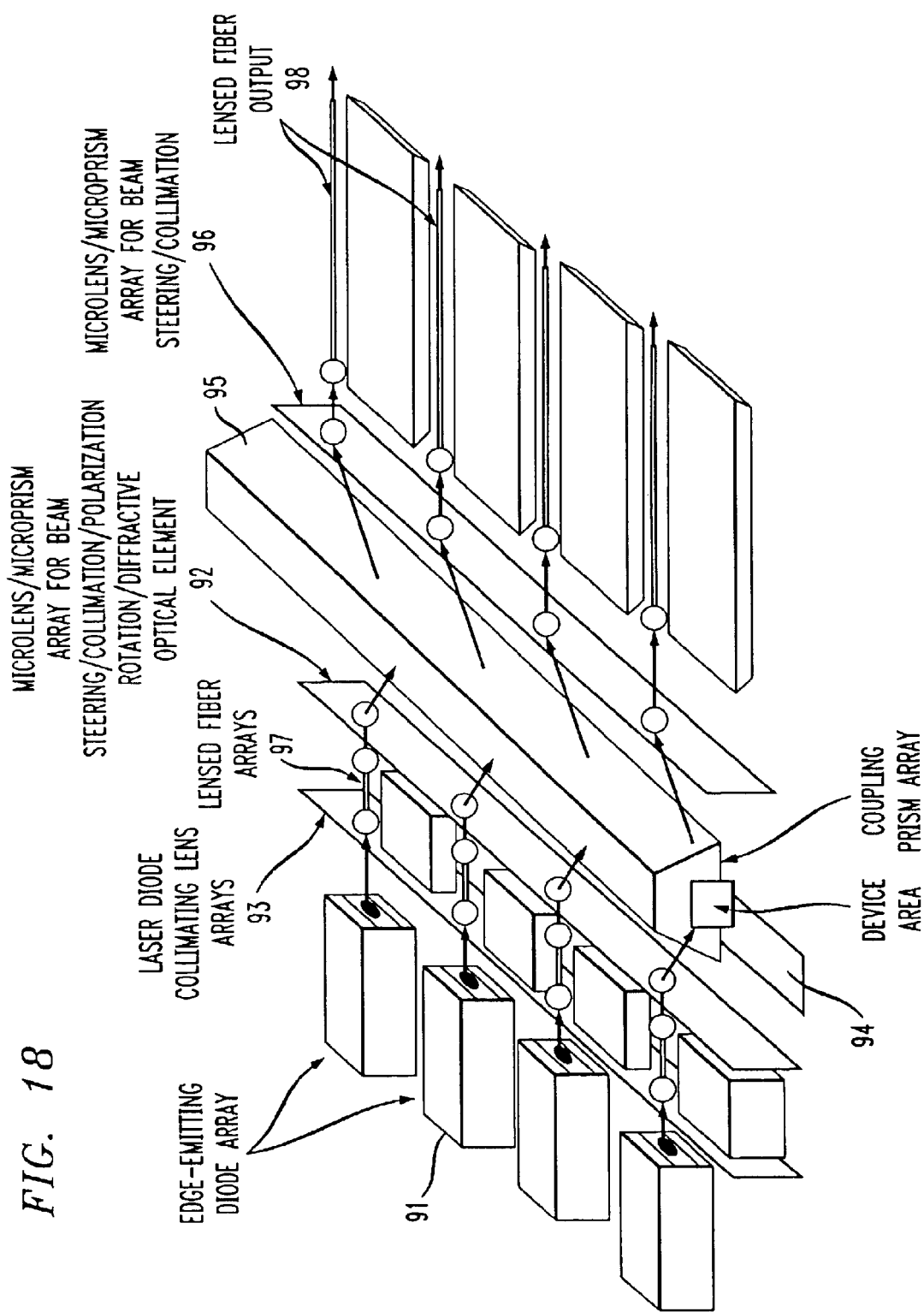
FIG. 18 is yet another embodiment similar to FIG. 16, further using an array of lensed fibers disposed in association with the beam steering arrangement.

FIG. 16 depicts an alternative embodiment, in which an array of laser sources 90 is incorporated directly in the package itself. Because VCSELs emit light through the surface facets and can have relatively small dimensions (on the order of 100–250 μm), they can be easily arrayed with a bar of silicon prism structures 94 etched in a silicon wafer or wafer die. Beam collimation and beam-steering can be achieved by arrays of refractive lenses 92 and diffractive lenses or beam-steering elements, as shown in FIG. 16. The dimensions of the elements in the lens array can range from a few microns to a few millimeters. More compact structures can be realized by directly etching the steering prisms and/or collimating lenses into the VCSEL wafer itself. The optical beams are delivered to a bar of prism structures 94 at substantially the same angle $\theta_{air}$, are coupled into waveguide 12, and emerge from output facet 95 of prism bar 94. A similar array of lenses and diffractive elements 96 is used to deflect, shape and focus the beams on to the receiving array of optical fibers 98. Alternatively, edge-emitting laser diodes 91 can be employed in a similar configuration, as shown in FIG. 17, provided that the pitch of the array is sufficient to accommodate the larger size of the edge-emitting device. Referring to FIG. 17, an embodiment utilizing edge-emitting laser diodes 91 further utilizes a laser diode collimating lens array 93, disposed at the output of edge-emitting laser diode array 91, where the collimating lens array is utilized to present a proper signal profile to beam steering element 92. FIG. 18 illustrates another version of the embodiment of FIG. 17, with a lensed fiber array 97 disposed at the output of collimating lens array 93.

Figure 19:
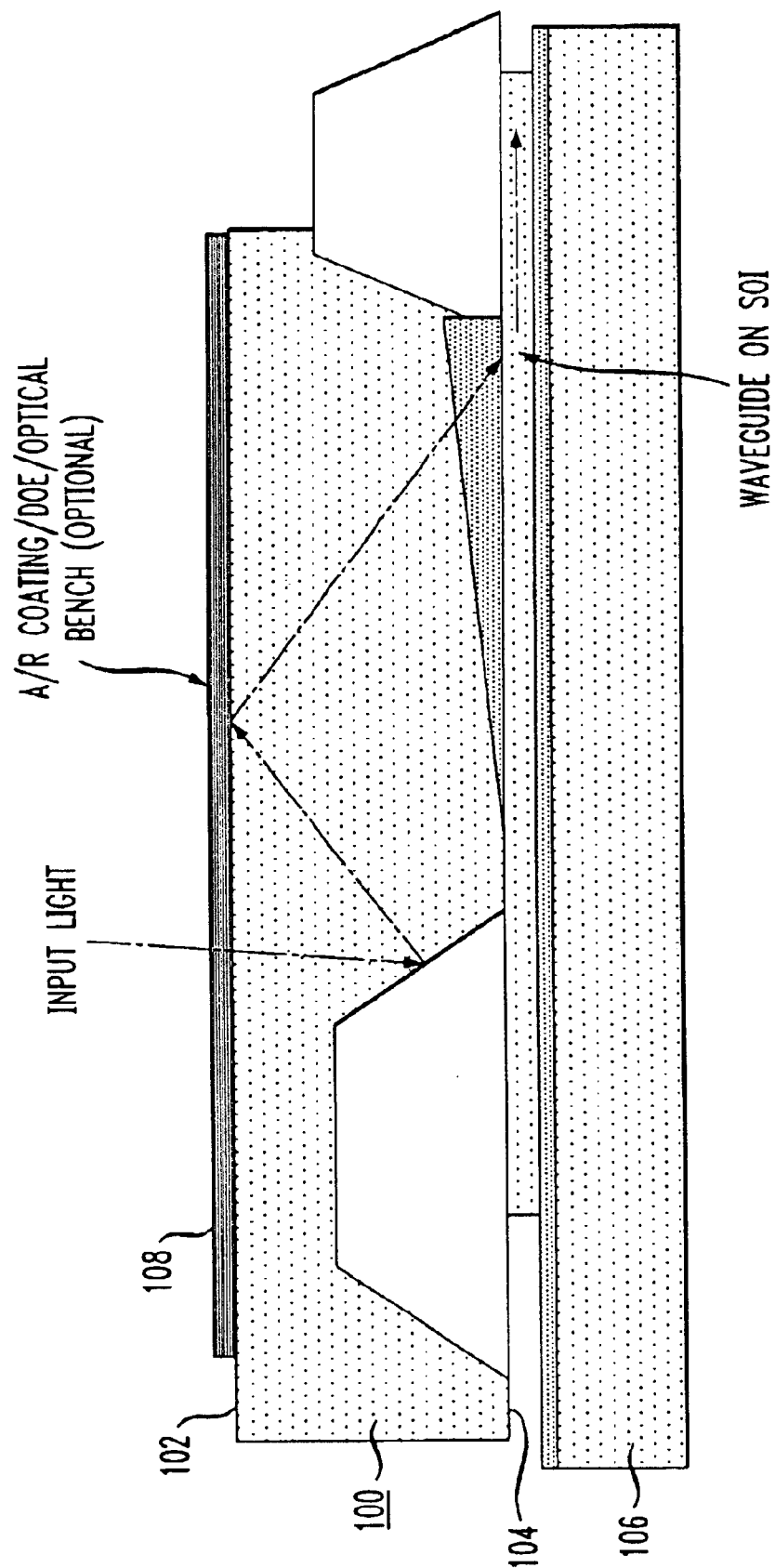
FIG. 19 illustrates a prism wafer that comprises additional optical elements to collimate and steer the beam prior to the interface with the evanescent coupling layer.

If it is desirable to reduce the total number of components and alignment procedures, required optical elements can be formed in the silicon prism wafer or die, as shown in FIG. 19. In this configuration, rather than delivering the input beam directly to an etched "hypotenuse" prism input facet at the required angle $\theta_{air}$, the beam enters the silicon prism wafer 100 through any user-specified surface of prism wafer 100. In the example of FIG. 19, the beam enters through a surface 102 of prism wafer 100 opposing the surface 104 (the prism coupling surface) that mates to an SOI wafer 106. As the beam propagates within prism wafer 100, it encounters a series of surfaces that change the direction of propagation until the desired launch angle in silicon, $\theta_{Si}$, is achieved. These surfaces can consist of the top surface 102 and bottom surface 104 of wafer 100, or any additional surfaces resulting from etch processes. For a beam propagating in a silicon wafer, total internal reflection at these surfaces can be achieved for a wide range of incidence angles, due to the high refractive index of silicon. For an air-silicon interface (assuming refractive indexes of n≈1 for air, and n≈3.5 for silicon), the required angle of incidence must exceed the critical angle for total internal reflection of 16.6°, while for a silicon nitride-silicon interface (assuming a refractive index of n≈2 for silicon nitride), the required angle of incidence must exceed 34.8°. If the angle of incidence falls below the critical value, very high reflectance can still be achieved by metallizing a portion 108 of surface 102 to serve as a mirror. As the thickness of the silicon wafer is relatively small, on the order of 500–700 μm, the beam can encounter a number of different reflecting surfaces as it propagates through a relatively short physical path length in silicon wafer 100 (on the order of a few mm). Thus, the silicon prism wafer itself can be employed as a compact, low-loss beam steering element.

In the simplest configuration, the prism wafer is used (1) to steer the beam to the appropriate angle $\theta_{Si}$, and (2) to couple the beam into the waveguide. After being launched in through the top surface of the silicon prism coupler, the beam refracts within the silicon wafer and impinges on the etched surface. The angle of incidence on the etched surface is sufficiently large that total internal reflection occurs at this surface, but sufficiently small that the totally internally reflected beam is launched towards the top surface. The angle of incidence on the top surface is sufficiently large that the beam is totally internally reflected again at the top surface. After totally internally reflecting at the top surface, the beam is launched at the appropriate launch angle $\theta_{Si}$ towards the optical coupling region. This method of beam steering is particularly useful because a wider range of launch angles $\theta_{Si}$ can be accessed compared to a direct launch from the top of the silicon prism coupler into the optical coupling region (due to the high refractive index of silicon). Additional optical functions may be added by incorporating optical elements at locations on the top surface that are in the direct path of the optical beam. In the example of FIG. 19, the elements would be located at the beam's initial entry point into the top surface of the silicon prism coupler, and at the point of total internal reflection on the top surface. These elements include, but are not limited to: refractive or diffractive lenses to collimate a diverging input beam, or other diffractive optical elements to provide additional beam steering, beam shaping, wavefront correction, or polarization control capabilities.

The use of such refractive and diffractive components allows additional optical functions, such as collimation and polarization control to be integrated into the silicon prism wafer. Microlenses can be formed in silicon through a combination of conventional lithographic, photoresist reflow, plasma etching, diffusion, and implantation techniques. Alternatively, gray-scale lithography can be employed to produce more complex, non-spherical lens shapes. Many diffractive elements, which are essentially grating structures, can be formed in the silicon substrate through conventional lithographic techniques. However, lithographic techniques with finer resolution (such as electron-bema lithography) may be required to produce sub-wavelength grating structures that can serve as polarization control elements.

Significant improvements in the coupling efficiency of exemplary devices such as FIG. 1 can be achieved by carefully considering how the shape of the beam impacts the device performance. There are three primary interfaces that must be considered: (1) the shape of the free-space input beam from the input optic; (2) the exact form of the evanescent coupling layer; and (3) the shape of the free-space output beam and the output receiving optic.

In general, the coupling efficiency can be determined by an overlap integral known from the prior art. It can be shown from this integration that 100% coupling efficiency can only be achieved when the input beam shape is matched to the output beam shape.

For the exemplary embodiment of FIG. 1, there are three relevant overlap integrals to consider:
(1) $\eta_1$=the beam shape of the optical source, relative to the desired beam projection on the prism coupling surface
(2) $\eta_2$=the beam shape on the input prism coupling surface relative to the beam delivered from the output prism coupling surface
(3) $\eta_3$=the beam shape delivered from the output prism coupling surface relative to the desired beam shape for the output receiving optic.

Figure 20:
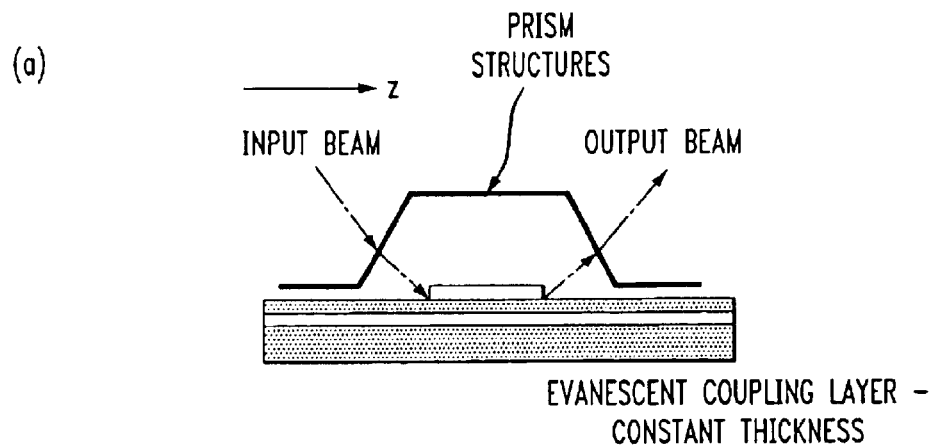
FIG. 20(a) illustrates the preferred embodiment of FIG. 1, with an evanescent coupling layer of constant thickness, with FIGS. 20(b) and (c) illustrating the profiles of the input and output beam amplitudes as a function of z, FIG. 20(d) illustrating the overlap of FIGS. 20(b) and (c)
Figure 20:
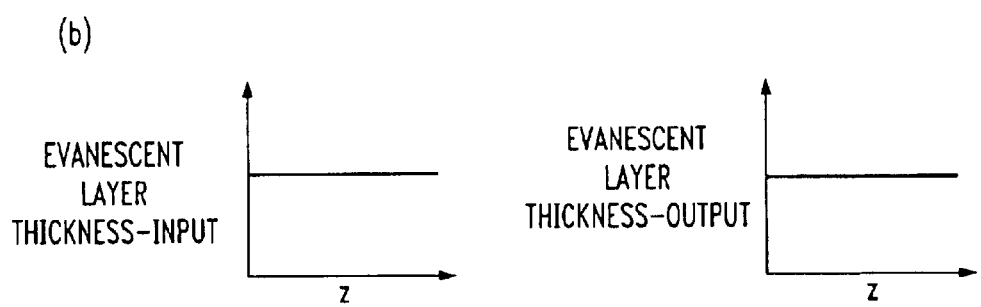
Figure 20:
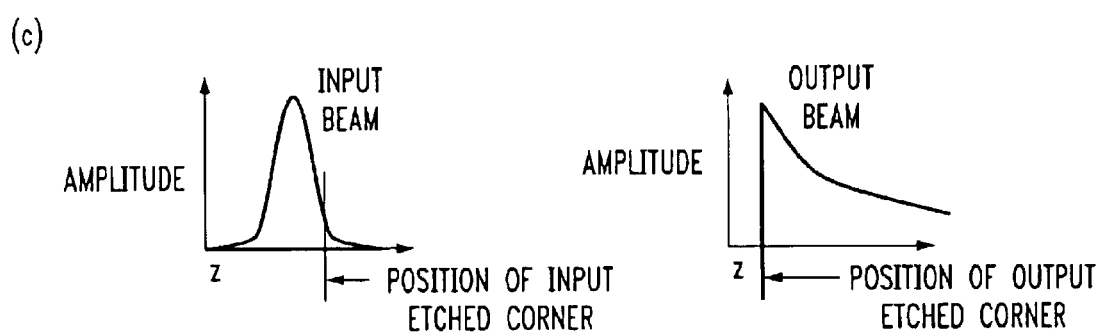
Figure 20:
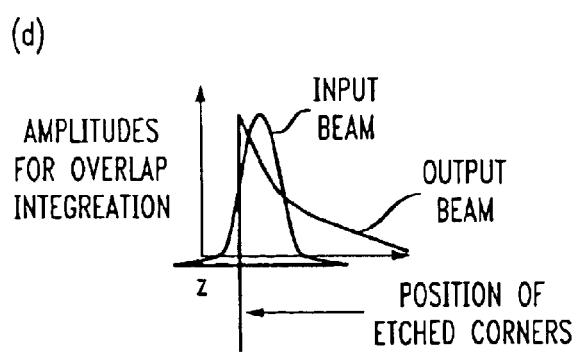

The coupling efficiency is first discussed in the context of the preferred embodiment shown in FIG. 20. This embodiment shows the input and output silicon prism is separated from the silicon waveguide by an evanescent coupling layer of constant thickness and constant refractive index.

The total coupling efficiency of the embodiment of FIG. 20, defined as:

$$\eta = \eta_1 \eta_2 \eta_3, \approx 64\%$$

for a standard fiber-pigtailed laser input and an optical fiber output. The coupling efficiency $\eta_1$ is determined by the loss associated with producing a well-collimated Gaussian beam from a source input such as a laser or optical fiber input. If the optics are integral to the source (for example using a lensed fiber or a laser source with integrated collimating and beam-shaping optics), $\eta_1$ is very high, close to 100%. However, the coupling efficiency $\eta_2$, determined by the ratio of the power in the output free-space beam of the prism relative to the power in the input free-space beam, cannot exceed 80% for a Gaussian input free-space beam. As known from the prior art, $\eta_2$ is limited because the input and output beams have different mode profiles for this preferred embodiment. The input beam has a Gaussian profile along the direction of travel, while the beam from the output prism has an exponential profile along the direction of travel (see amplitude vs. position plots in FIG. 20(b) and (c)). Finally, by the exact same argument, $\eta_3$, the efficiency in coupling to the output fiber, is approximately 80%. Again, this is due to the incomplete overlap between the free-space beam with the exponential envelope emerging from the prism, and the desired Gaussian beam shape at the fiber output. Thus, $$\eta = \eta_1 \eta_2 \eta_3 \approx (1)*(0.8)*(0.8) = 0.64$$

or approximately 2 dB insertion loss.

Figure 21:
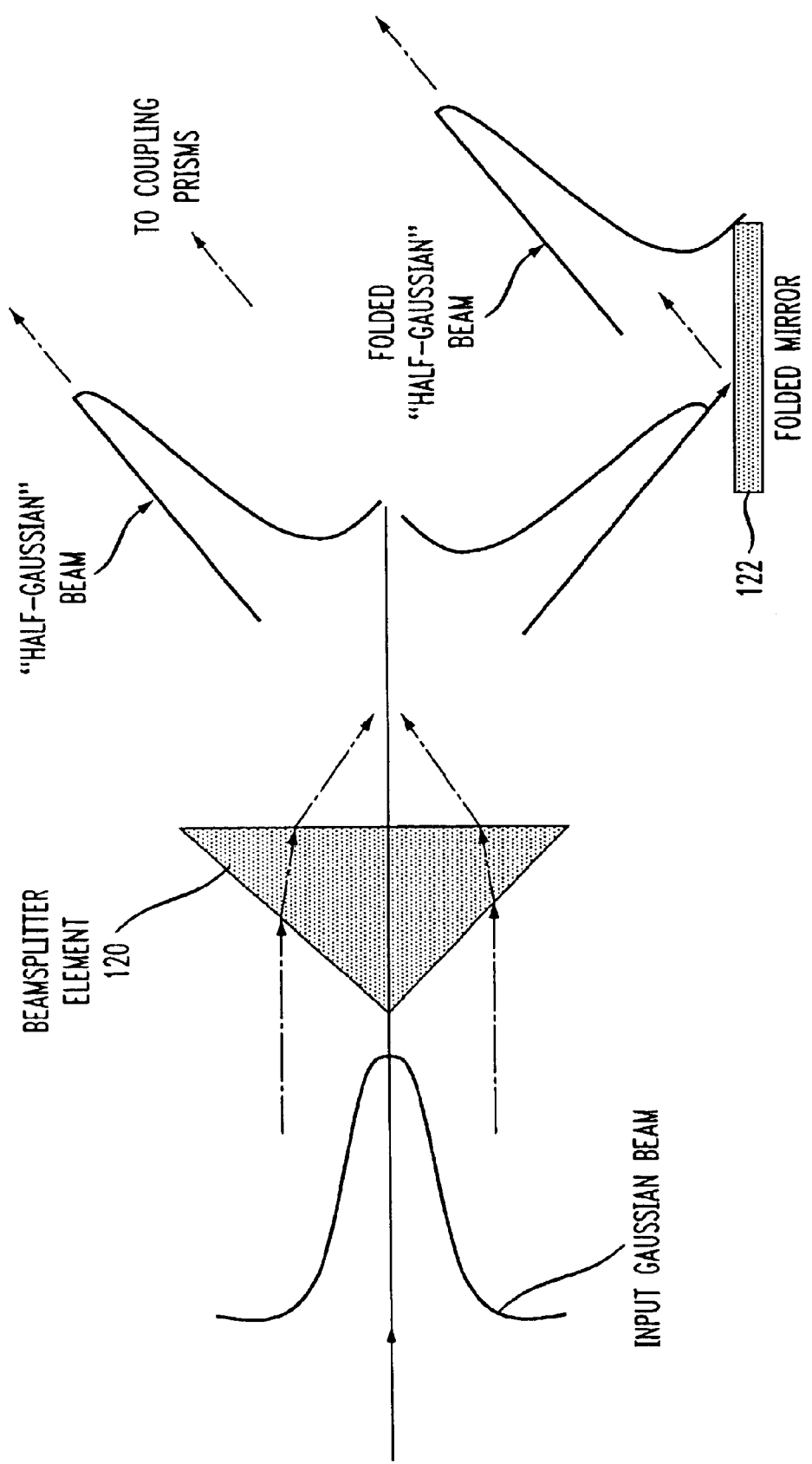
FIG. 21 contains a diagram illustrating a particular arrangement for forming a half-Gaussian wave.

To improve the coupling efficiency through the embodiment of FIG. 20, it is clear that further beam shaping is required to increase $\eta_2$ or $\eta_3$ above 80%. For an optical source such as a laser, the most common beam shapes have a Gaussian or flat-top distribution; it can be shown that both shapes yield coupling efficiencies $\eta_2$=80%. In order to improve $\eta_2$, it is clear that the input beam shape will need to have a profile that is closer to the exponential envelope that emerges from the output prism. One method of accomplishing this is by using a "half-Gaussian" input beam shape. As shown in FIG. 21, the original input Gaussian beam is incident upon a beam-splitter structure 120, with the center of the beam aligned at the intersection of the beam splitter surfaces. The two beam halves are then separately delivered to the prism (not shown) and coupled to the waveguide. Appropriate optics (for example a fold mirror 122) can be used to reverse the profile of one of the beam halves. It is important that the beam halves not be recombined prior to the entry in the waveguide, as this will result in strong interference fringes that will modulate the intensity profile of the input beam. In this case, $\eta_2$=the overlap integration of a half-Gaussian beam shape with the exponential shape of the output beam=97%. It is realistic that the coupling efficiency $\eta_1$ will be reduced in the conversion to the two half-Gaussians; clearly $\eta_1$>83% if there is to be any significant advantage gained in modifying the input beam profile. It is more difficult to increase the coupling efficiency $\eta_3$ as standard methods (aperturing, etc.) used to produce a more Gaussian profile from an input beam significantly reduce the intensity. It is anticipated that the maximum overall coupling efficiency $\eta$ that can be achieved for the configuration of FIG. 20 is about 80% with the additional input beam shaping, and about 64% without additional input beam shaping.

Figure 22:
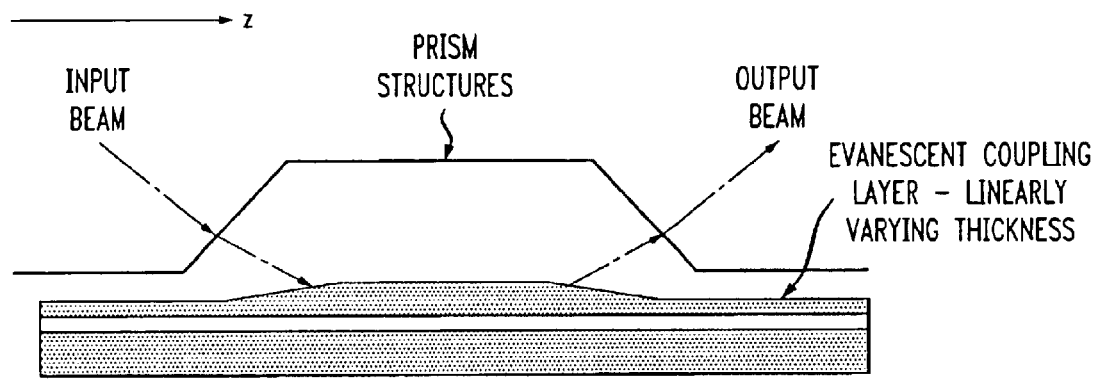
FIG. 22 illustrates the preferred embodiment of FIG. 1, with an evanescent coupling layer of linearly varying thickness, also illustrating the profiles of the input and output beam amplitudes as a function of z, as well as the overlap of the input and output beam amplitudes.
Figure 22:
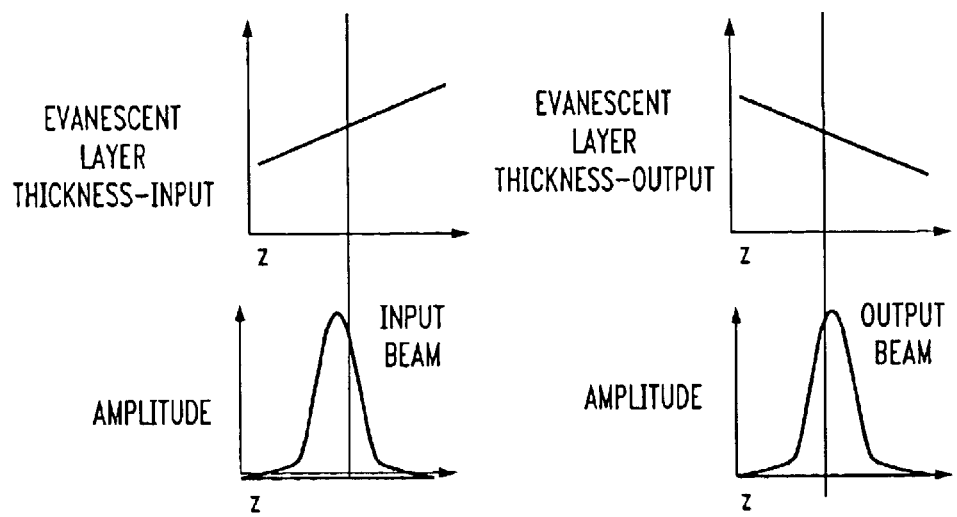

More significant and realizable improvements in overall coupling efficiency $\eta$ can be achieved in the embodiment of FIG. 22. This embodiment shows the silicon prism separated from the silicon waveguide by an evanescent coupling layer that varies linearly with position. At the input facet, the thickness of the evanescent coupling layer is smaller when power is first transferred to the waveguide than its value when most of the power has been transferred to the guide. For the output facet, the thickness of the evanescent coupling layer is larger in value while most of the power is still within the waveguide, and decreases in magnitude as power continues to couple out of the waveguide and into the prism. This method permits higher coupling efficiency than the embodiment of FIG. 20, since an approximate Gaussian beam shape can be maintained all the way from the input source to the output fiber connection.

As before, the standard input beam from a laser source or a fiber input will be a collimated Gaussian beam with a high coupling efficiency $\eta_1$. To improve the coupling efficiency $\eta_2$, the profile of the output free-space beam from the prism must be more similar to that of a Gaussian beam. While the output beam in general will not be truly Gaussian, if the overlap integral of the new output beam with the input Gaussian beam exceeds the overlap integral of the exponential envelope with the input Gaussian beam, the coupling efficiency can be improved beyond 80%. It is known from the technical literature that one method to make the output beam more Gaussian is to grade the thickness of the evanescent coupling layer along the direction of travel. If the evanescent coupling layer is constant in thickness, light is coupled out of the waveguide to the prism with the same coupling strength at all points, resulting in an output beam profile given by $g(z) \propto \exp(-\alpha z)$ (see FIG. 20). The coupling strength decreases with increasing evanescent coupling layer thickness and increases with decreasing evanescent coupling layer thickness. If the output beam is to be more closely matched to the input beam, the first light exiting from the prism surface should be coupled fairly weakly, so that most of the light remains in the waveguide. To ensure that this occurs, the evanescent coupling layer should be well above the optimum coupling value. After this point, the coupling strength seen by the light needs to increase so that the majority of light can be extracted to form the peak of the "Gaussian" output beam. Thus, this portion of the beam must sample the interface where the evanescent layer is close to the optimal thickness. Now, the majority of the energy is transferred from the guide and exits the system entirely through the output prism. Although the coupling strength continues to increase with the decreasing evanescent layer thickness, the amount of light exiting the prism starts to decrease as the light in the waveguide drops to lower and lower levels. In this manner, a more Gaussian-like profile for the output beam is achieved. While the output beam in general is not truly Gaussian, it can be shown that the overlap integral of the new output beam with the input Gaussian beam $\eta_2 \approx 97\%$. It is important that the slope of the evanescent coupling layer has the correct value to produce the desired beam shape. The determination of this slope was discussed earlier in the beam size section.

The coupling efficiency $\eta_3$ can now be quite high because the output free-space beam from the prism already has the Gaussian shape required by the output fiber connection. As before, the overlap integral $\eta_3$ of the approximate Gaussian from the output prism with the Gaussian mode characterizing the fiber can be as high as 97%. If necessary, collimating and circularizing optics similar to those used to shape the laser diode beam prior to delivery to a fiber optic cable can be used to reduce any output beam divergence or ellipticity. The final lens that focuses the collimated beam down to the fiber is always required. This lens is an integral part of a lensed fiber or collimator assembly, or a separate ball lens or gradient-index lens may be used with an ordinary fiber termination for this purpose.

The total coupling efficiency for the embodiment of FIG. 22 is then given by:

$$\eta = \eta_1 \eta_2 \eta_3 \approx (1)*(0.97)*(0.97) \approx 0.94,$$

or approximately 0.3 dB. This is perhaps the simplest method of achieving very high efficiency end-to-end coupling from a laser or fiber-based input to a fiber output, and enables the technology to be used for additional applications that are more sensitive to insertion loss. However, the gain in coupling efficiency must be weighed against the additional demands of gray-scale lithography required to produce the variation of thickness in the evanescent coupling layer. It should be noted that high coupling efficiencies $\geq 94\%$ can be achieved with any configuration of an evanescent coupling layer that produces a similar approximate Gaussian output beam or a more truly Gaussian output beam from the output prism. That is, the improved coupling efficiency is not restricted to an evanescent coupling layer with a linear variation in thickness. For the purposes of this invention, "more truly Gaussian" can be defined as any output beam profile that increases the value of the known overlap integral. As an example, it can be shown that a logarithmic variation of the evanescent coupling layer with distance along the guide will produce a more truly Gaussian beam than a linear variation. (Plotting coupling efficiency versus layer thickness on a logarithmic scale leads to a more symmetric coupling efficiency peak or curve). Manufacturing such a thickness profile will generally be more complicated, but would be required if 94% total coupling efficiency is not sufficient to meet the insertion loss requirements of the application.

What is claimed is:

1. An optical coupling arrangement for providing a signal path into and out of a silicon optical waveguide formed in a surface layer of a silicon-on-insulator (SOI) wafer comprising a silicon optical waveguide layer disposed over an insulator layer formed on a silicon substrate, the optical coupling arrangement comprising a silicon-based prism coupler disposed to intercept an incoming optical beam from a light source, said silicon-based prism coupler being permanently attached to said SOI wafer in a manner such that a first surface of said prism coupler is disposed substantially parallel to, and mated with, a flat surface of said SOI wafer, the refractive index of said silicon-based prism coupler equal to or greater than the refractive index of said silicon optical waveguide;

free-space micro-optic input elements interposed between the light source and the silicon-based prism coupler, to collimate, shape and steer the optical beam to a specific entry point and angle of incidence upon the silicon-based prism coupler;

an evanescent coupling region disposed between said silicon-based prism coupler and said silicon optical waveguide; and free-space micro-optic optic elements placed in the path of the beam that emerges from the output surface of the silicon-based prism coupler, to shape, collimate or focus the optical beam, and to steer the optical beam toward a receiving element.

2. The optical coupler arrangement of claim 1, wherein the arrangement further comprises a light source coupled to the free-space micro-optic input elements.

3. The optical coupling arrangement of claim 2, wherein the wavelength of the light source falls in the range of 1.1–1.65 μm.

4. The optical coupling arrangement of claim 2, wherein the output beam of the light source is substantially single-mode.

5. The optical coupling arrangement of claim 2, wherein substantially all the power of the light source falls within ±5 nm of the center wavelength.

6. The optical coupling arrangement of claim 5, wherein the micro-optic free-space input elements subsequent to the edge-emitting laser diode include a first micro-optic element to reduce the divergence angle of the output beam perpendicular to the junction to the magnitude of the divergence angle of the output beam parallel to the junction, correct astigmatism, and produce a circular beam, followed by a second micro-optic element to collimate the beam.

7. The optical coupling arrangement of claim 2, wherein the light source is an edge-emitting laser diode.

8. The optical coupling arrangement of claim 7, wherein the micro-optic free-space input elements subsequent to the edge-emitting laser diode include a gradient-index micro-cylindrical lens to collimate the output beam perpendicular to the junction, followed by a second micro-cylindrical lens to collimate the output beam parallel to the diode junction.

9. The optical coupling arrangement of claim 7, wherein the micro-optic free-space input elements subsequent to the edge-emitting laser diode includes a first ball lens to collimate the beam, followed by a second ball lens to focus the beam to a receiving optical fiber assembly interposed between the diode and the silicon-based prism coupler.

10. The optical coupling arrangement of claim 7, wherein the micro-optic free-space input elements subsequent to the edge-emitting laser diode includes a first aspheric lens to collimate the beam, followed by a second aspheric lens to focus the beam to a receiving optical fiber assembly interposed between the diode and the silicon-based prism coupler.

11. The optical coupling arrangement of claim 7, wherein the micro-optic free-space input elements subsequent to the edge-emitting laser diode include a micro-optic waveplate to rotate the direction of polarization.

12. The optical coupling arrangement of claim 2, wherein the light source is a vertical-cavity surface-emitting laser diode.

13. The optical coupling arrangement of claim 12, wherein the micro-optic free-space input elements subsequent to the vertical-cavity surface-emitting laser diode include a micro-optic collimating lens.

14. The optical coupling arrangement of claim 13, wherein the micro-optic collimating lens is a silicon microlens.

15. The optical coupling arrangement of claim 12, wherein the micro-optic free-space input elements subsequent to the vertical-cavity surface-emitting laser diode include a micro-optic waveplate to rotate the direction of polarization.

16. The optical coupling arrangement of claim 12, wherein the micro-optic free-space input elements subsequent to the vertical-cavity surface-emitting laser diode include an optical element that converts an incident beam with unknown polarization state into two separate output beams of the same known polarization state, with the second beam displaced from, but substantially parallel to, the first beam.

17. The optical coupling arrangement of claim 2, wherein the light source is an optical fiber.

18. The optical coupling arrangement of claim 17, wherein the optical fiber is single-mode and supports any polarization state.

19. The optical coupling arrangement of claim 17, wherein the optical fiber is single-mode polarization-maintaining fiber.

20. The optical coupling arrangement of claim 17, wherein the micro-optic free-space input elements subsequent to the optical fiber include a micro-optic collimating lens.

21. The optical coupling arrangement of claim 20, wherein the micro-optic collimating lens is fused to the optical fiber to form a lensed fiber.

22. The optical coupling arrangement of claim 21, wherein the collimated beam diameter exiting the lensed fiber ranges in size from 10–110 $\mu$m.

23. The optical coupling arrangement of claim 17, wherein the micro-optic free-space input elements subsequent to the optical fiber include an optical element that converts an incident beam with unknown polarization state into two separate output beams of the same known polarization state, with the second beam displaced from but substantially parallel to the first beam.

24. The optical coupling arrangement of claim 1, wherein the micro-optic free-space input elements include a refractive wedge of a material of high refractive index, to effect an angular deflection of the incident beam.

25. The optical coupling arrangement of claim 1, wherein the micro-optic free-space input elements include a reflective element that can be translated and rotated through an electronic actuation mechanism, to effect a translation and an angular deflection of the incident beam.

26. The optical coupling arrangement of claim 1, wherein the micro-optic free-space input elements include a diffractive optical element to effect an angular deflection of the incident beam.

27. The optical coupling arrangement of claim 1, wherein the evanescent coupling region is substantially constant in thickness.

28. The optical coupling arrangement of claim 1, wherein the evanescent coupling region is tapered in thickness.

29. The optical coupling arrangement of claim 1, wherein the arrangement further comprises an optical receiving element disposed to receive the output optical beam from the free-space micro-optic output elements.

30. The optical coupling arrangement of claim 29 wherein the receiving element is an optical fiber.

31. The optical coupling arrangement of claim 30, wherein the receiving optical fiber is a lensed fiber.

32. The optical coupling arrangement of claim 1, wherein input and output micro-optic elements, and the input and output surfaces of the silicon-based prism coupler, are covered with antireflective coatings.

33. The optical coupling arrangement of claim 1, wherein the thickness of the waveguide of the SOI wafer is selected such that the thickness of the evanescent coupling region that optimizes coupling efficiency for a given wavelength and input beam size is substantially equal to a quarter-wave thickness of the material that comprises the evanescent coupling region for the same wavelength.

34. The optical coupling arrangement of claim 33, wherein the evanescent coupling layer and the anti-reflective coating for the silicon-based prism wafer may be formed simultaneously, using one process step.

35. An optical coupling arrangement for providing a signal path into and out of a silicon optical waveguide formed in a surface layer of a silicon-on-insulator (SOI) wafer comprising a silicon optical waveguide layer disposed over an insulator layer formed on a silicon substrate, the optical coupling arrangement comprising a silicon-based prism coupler permanently attached to said SOI wafer in a manner such that a first surface of said prism coupler is disposed substantially parallel to, and mated to, a flat surface of said SOI wafer, the refractive index of said silicon-based prism coupler equal to or greater than the refractive index of said silicon optical waveguide;

optical elements formed as integral parts of said silicon-based prism coupler, to collimate, shape and steer the input optical beam to a specific entry point and angle of incidence upon the coupling surface of the silicon-based prism coupler;

an evanescent coupling region disposed between said silicon-based prism coupler and said silicon optical waveguide; and free-space micro-optic output elements placed in the path of the beam that emerges from the output surface of the silicon-based prism coupler, to shape, collimate or focus the optical beam, and to steer the optical beam toward a receiving element.

36. The optical coupling arrangement of claim 35, wherein angled surfaces are anisotropically etched in the silicon-based prism coupler, to effect an angular deflection of the incident beam through total internal reflection.

37. The optical coupling arrangement of claim 35, wherein a subset of surfaces formed in the silicon-based prism coupler are coated with thin metal layers to serve as reflective elements and effect an angular deflection of the incident beam.

38. The optical coupling arrangement of claim 35, wherein the evanescent coupling region is tapered in locations where the optical beam enters the waveguide from the silicon-based prism coupler at the input prism coupling surface, and exits the waveguide to the silicon-based prism coupler at the output prism coupling surface, such that a substantially Gaussian mode profile characterizes the optical beam at all points in the optical coupling arrangement external to the waveguide of the SOI wafer.

39. The optical coupling arrangement of claim 38, wherein the substantially Gaussian mode profile of the output beam resulting from use of the tapered region of the evanescent coupling layer enables high-efficiency coupling to a receiving fiber.

40. The optical coupling arrangement of claim 35, wherein the thickness of the waveguide of the SOI wafer is selected such that light launched from the source parallel to the wafer surface, and incident upon the input prism facet, is refracted by the silicon-based prism coupler at an angle that is associated with high coupling efficiency for a specific wavelength.

41. The optical coupling arrangement of claim 35, wherein the thickness of the waveguide of the SOI wafer is selected such that light launched from the source perpendicular to the wafer surface, and incident upon the input prism facet, is refracted by the silicon-based prism coupler at an angle that is associated with high coupling efficiency for a specific wavelength.

42. The optical coupling arrangement of claim 35, wherein the arrangement further comprises a light source.

43. The optical coupling arrangement of claim 42, wherein the light source is a vertical-cavity surface-emitting laser diode of an appropriate wavelength.

44. The optical coupling arrangement of claim 35, wherein the thickness of the waveguide of the SOI wafer is selected such that light launched from the source, and incident upon the input prism facet, is refracted by the silicon-based prism coupler such that the projection of the optical beam upon the prism coupling surface remains substantially constant over a wide range of wavelengths.

45. The optical coupling arrangement of claim 35, wherein micro-lenses are formed in surfaces of the silicon-based prism wafer other than the mating surface to the SOI wafer, to effect collimation of the incident beam.

46. The optical coupling arrangement of claim 35, wherein diffractive optical elements are formed on surfaces of the silicon-based prism wafer other than the mating surface to the SOI wafer, to effect shaping, dispersion or an angular deflection of the incident beam.

* * * * *